(12) United States Patent
Sessions

(10) Patent No.: US 12,375,872 B2
(45) Date of Patent: Jul. 29, 2025

(54) WIRELESS BICYCLE COMPONENT COMMUNICATION AND CONTROL USING ULTRA WIDEBAND RADIO

(71) Applicant: SRAM, LLC, Chicago, IL (US)

(72) Inventor: Shelby Sessions, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 339 days.

(21) Appl. No.: 17/953,825

(22) Filed: Sep. 27, 2022

(65) Prior Publication Data

US 2024/0107264 A1    Mar. 28, 2024

(51) Int. Cl.
| | |
|---|---|
| *H04W 36/00* | (2009.01) |
| *B62J 45/41* | (2020.01) |
| *B62J 50/22* | (2020.01) |
| *B62M 6/50* | (2010.01) |
| *B62M 9/122* | (2010.01) |
| *G01S 13/02* | (2006.01) |
| *H04W 4/02* | (2018.01) |
| *H04W 4/80* | (2018.01) |
| *H04W 12/50* | (2021.01) |

(52) U.S. Cl.
CPC ............. *H04W 4/023* (2013.01); *B62J 45/41* (2020.02); *B62J 50/22* (2020.02); *B62M 6/50* (2013.01); *B62M 9/122* (2013.01); *G01S 13/0209* (2013.01); *H04W 4/80* (2018.02); *H04W 12/50* (2021.01)

(58) Field of Classification Search
CPC ....... H04W 4/023; H04W 4/80; H04W 12/50; H04W 4/38; H04W 4/40; B62J 45/41; B62J 50/22; B62M 6/50; B62M 9/122; B62M 2025/006; B62M 9/132; G01S 13/0209; B62K 23/06; B62L 3/02
USPC ....................................... 455/456.3
See application file for complete search history.

(56) References Cited

U.S. PATENT DOCUMENTS

| | | | |
|---|---|---|---|
| 6,731,202 | B1 | 5/2004 | Klaus |
| 9,966,785 | B2 | 5/2018 | Kato et al. |
| 10,511,945 | B2 | 12/2019 | Masuda et al. |
| 11,319,018 | B2 | 5/2022 | Yamazaki et al. |
| 2017/0334350 | A1 | 11/2017 | Rink |
| 2019/0135229 | A1 | 5/2019 | Ledvina |
| 2020/0130777 | A1 * | 4/2020 | Yamazaki .............. B62M 25/08 |
| 2022/0109561 | A1 | 4/2022 | Yang |

FOREIGN PATENT DOCUMENTS

| | | |
|---|---|---|
| GB | 2550378 A | 11/2017 |
| TW | 202015965 | 5/2020 |
| TW | 202031548 | 9/2020 |
| TW | 202126535 | 7/2021 |

* cited by examiner

*Primary Examiner* — Tanmay K Shah

(57) ABSTRACT

A controller device for a bicycle includes a communication interface configured to receive a signal from another controller device. The controller device also includes a sensor including an ultra-wideband radio. In response to the received signal, the sensor is configured to determine a distance between the controller device and the other controller device using the ultra-wideband radio. The controller device also includes a processor in communication with the sensor. The processor is configured to initiate an action of the controller device or an electronic device in communication with the controller device based on the determined distance.

18 Claims, 13 Drawing Sheets

WIRELESS BICYCLE COMPONENT COMMUNICATION AND CONTROL USING ULTRA WIDEBAND RADIO

BACKGROUND

1. Field of the Disclosure

The present disclosure is generally directed to control of and communication between bicycle components, and, more particularly, to control of and communication between bicycle components based on ultra-wideband radio distance measurements.

2. Description of Related Art

A bicycle includes various components that allow a user to control the operation of the bicycle. For example, the bicycle may include a drivetrain where one or more gears may be selectably engaged with a drive chain to modify pedaling cadence and resistance. Correspondingly, the bicycle may include controller devices that receive input from the user to cause the drive chain to engage different gears. At least some of these components may be electronic components to be paired with each other, such that the electronic components may communicate. This pairing process may involve pressing multiple physical buttons on a number of the electronic components in a specific order or interacting with a smartphone application.

SUMMARY

In one example, a controller device for a bicycle includes a communication interface configured to receive a signal from another controller device. The controller device also includes a sensor including an ultra-wideband radio. In response to the received signal, the sensor is configured to determine a distance between the controller device and the other controller device using the ultra-wideband radio. The controller device also includes a processor in communication with the sensor. The processor is configured to initiate an action of the controller device or an electronic device in communication with the controller device based on the determined distance.

In one example, the controller device is an electronic rear derailleur or an electronic seatpost.

In one example, the ultra-wideband radio is a first ultra-wideband radio, the controller device is a first controller device of the bicycle, and the other controller device is a second controller device of the bicycle. The sensor is configured to determine a distance between the first ultra-wideband radio of the controller and a second ultra-wideband radio. The second ultra-wideband radio is an ultra-wideband radio of the second controller.

In one example, the processor is further configured to compare the determined distance to a predetermined threshold distance. The processor being configured to initiate the action of the controller device or the electronic device based on the determined distance includes the processor being configured to initiate the action of the controller device or the electronic device when, based on the comparison, the determined distance is less than the predetermined threshold distance.

In one example, the processor being configured to initiate the action of the controller device or the electronic device based on the determined distance further includes the processor being configured to initiate pairing of the second controller device to the first controller device when, based on the comparison, the determined distance is less than the predetermined threshold distance.

In one example, the signal is a first signal, and the distance is a first distance. The communication interface is further configured to receive a second signal from a third controller device of the bicycle. In response to the received second signal, the sensor is further configured to determine a second distance using the first ultra-wideband radio. The second distance is between the first controller device and a third controller device of the bicycle. The processor is further configured to compare the determined second distance to the predetermined threshold distance, and initiate pairing of the third controller device to the first controller device when, based on the comparison of the determined second distance to the predetermined threshold distance, the determined second distance is less than the predetermined threshold distance.

In one example, the processor is further configured to ignore the received second signal when, based on the comparison of the determined second distance to the predetermined threshold distance, the determined second distance is greater than the predetermined threshold distance.

In one example, the other controller device is a controller device of another bicycle. The action of the electronic device includes communication of a representation of the determined distance.

In one example, the processor being configured to communicate the representation of the determined distance using the electronic device includes the processor being configured to compare the determined distance to a predetermined threshold distance, and notify a user of the controller device using the electronic device when, based on the comparison, the determined distance is less than the predetermined threshold distance or the determined distance is greater than the predetermined threshold distance.

In one example, the electronic device includes a display, a sound generator, or the display and the sound generator. The processor is configured to notify the user of the controller device using the display, the sound generator, or the display and the sound generator when, based on the comparison, the determined distance is less than the predetermined threshold distance or the determined distance is greater than the predetermined threshold distance.

In one example, the other controller device is positionally fixed relative to a surface on which the bicycle is movable. The processor being configured to initiate the action of the electronic device based on the determined distance includes the processor being configured to communicate a representation of the determined distance using the electronic device.

In one example, the controller device is a first controller device of the bicycle, and the other controller device is a second controller device of the bicycle. The second controller device of the bicycle is supported by a handlebar of the bicycle. The processor is further configured to determine a steering angle based on the determined distance. The processor being configured to initiate the action of the electronic device based on the determined distance includes the processor being configured to initiate the action of the electronic device based on the determined steering angle.

In one example, the controller device is a first controller device of the bicycle, and the other controller device is a second controller device of the bicycle. The second controller device of the bicycle being is by a suspension component of the bicycle. The processor is further configured to determine suspension dynamics based on the determined distance. The processor being configured to initiate the action of the electronic device based on the determined distance includes the processor being configured to initiate the action of the electronic device based on the determined suspension dynamics.

In one example, the suspension dynamics include travel and rebound of the suspension component.

In one example, a system for a bicycle includes a first controller device. The first controller device includes a first communication interface, a first sensor including a first ultra-wideband radio, and a first processor in communication with the first sensor and the first communication interface. The first processor is configured to generate a signal and transmit, via the first communication interface, the signal. The system also includes a second controller device. The second controller device includes a second communication interface, a second sensor including a second ultra-wideband radio, and a second processor in communication with the second sensor and the second communication interface. The second processor is configured to receive, via the second communication interface, the signal. The second processor is further configured to in response to the received signal, initiate a distance measurement between the second controller device and the first other controller device using the second ultra-wideband radio and the first ultra-wideband radio. The second processor is further configured to initiate an action of the second controller device, the first controller device, or an electronic device in communication with the second controller device based on the measured distance.

In one example, the second controller device is an electronic derailleur or an electronic seatpost, and the first controller device is a shifter device.

In one example, the second processor is further configured to compare the measured distance to a predetermined threshold distance. The second processor being configured to initiate the action based on the measured distance includes the second processor being configured to initiate the action of the second controller device, the first controller device, or the electronic device when, based on the comparison, the measured distance is less than the predetermined threshold distance.

In one example, the processor being configured to initiate the action of the second controller device, the first controller device, or the electronic device based on the measured distance further includes the processor being configured to initiate pairing of the first controller device to the second controller device when, based on the comparison, the measured distance is less than the predetermined threshold distance.

In one example, the second processor is further configured to determine a steering angle based on the measured distance. The processor being configured to initiate the action of the second controller device, the first controller device, or the electronic device based on the measured distance includes the processor being configured to initiate display of a representation of the determined steering angle at the electronic device.

In one example, a controller device for a bicycle includes a communication interface configured to receive a first signal from a first electronic device and a second signal from a second electronic device. The controller device further includes a sensor including an ultra-wideband radio. In response to the received first signal, the sensor is configured to determine a first distance using the ultra-wideband radio. The first distance is between the controller device and the first electronic device. In response to the received second signal, the sensor is configured to determine a second distance using the ultra-wideband radio. The second is between the controller device and the second electronic device. The controller device further includes a processor in communication with the sensor. The processor is configured to compare the determined first distance to a predetermined threshold distance and compare the determined second distance to the predetermined threshold distance. The processor is further configured to initiate pairing of the first electronic device to the controller device when, based on the comparison of the determined first distance to the predetermined threshold distance, the determined first distance is less than the predetermined threshold distance. The processor is further configured to initiate pairing of the second electronic device to the controller device when, based on the comparison of the determined second distance to the predetermined threshold distance, the determined second distance is less than the predetermined threshold distance.

BRIEF DESCRIPTION OF THE DRAWINGS

Objects, features, and advantages of the present invention will become apparent upon reading the following description in conjunction with the drawing figures, in which.

Other aspects and advantages of the embodiments disclosed herein will become apparent upon consideration of the following detailed description, wherein similar or identical structures have similar reference numerals.

DETAILED DESCRIPTION

Figure 1A:
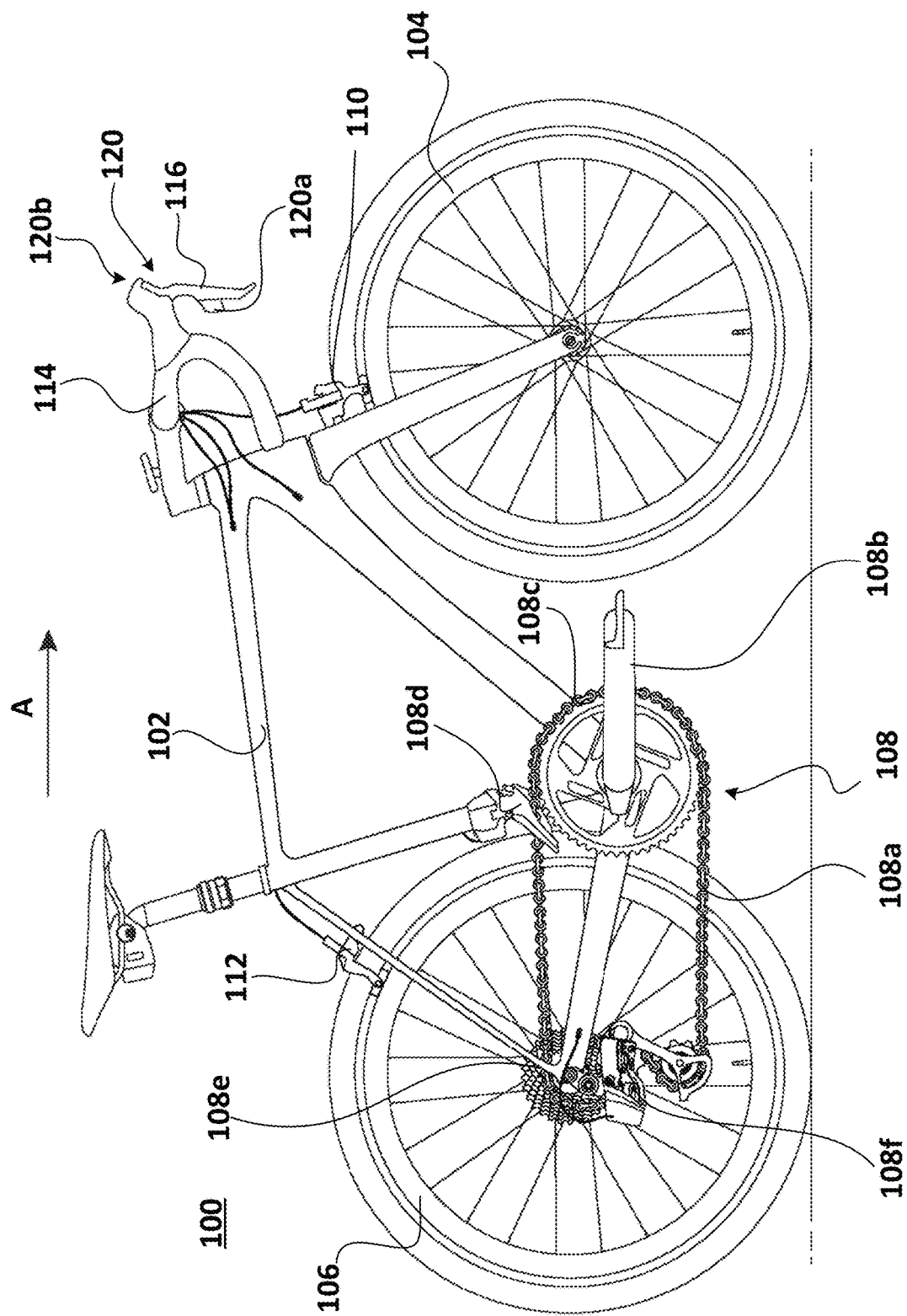
FIG. 1A is a right-side view of an example road bicycle that may implement aspects of the present disclosure.

Bicycles with electronic components include a number of different devices that are to be able to pair and communicate together. This pairing process may involve pressing multiple physical buttons on the different devices in a specific order or interacting with a smartphone application. Further, riders of bicycles with electronic components may want to interact with other nearby bicycles or devices through, for example, bicycle head units or smartphones. Previously, such interaction may have been through Bluetooth or ANT+. These communication systems do not include reliable information about distance or direction with respect to the interacting bicycles and/or devices.

In order provide an easier pairing process and allow for reliable interaction between the bicycles and/or devices, distance and direction information (e.g., orientation data) between electronic components of one or more bicycles may be determined using distance sensors of the electronic components, respectively. The distance sensors may be, for example, ultra-wideband radios configured to determine the orientation data.

For example, a primary controller device (e.g., an electronic component) of a bicycle, such as, for example, an electronic rear derailleur or an electronic seatpost, periodically listens for wireless messages from other unpaired electronic devices of the bicycle. When the primary controller device receives a message from one or more of the other unpaired electronic devices, the primary controller device initiates one or more distance measurements using a distance sensor of the primary controller device to determine a distance between the primary controller device and any other controller devices within range. If the other unpaired controller devices are within a predetermined distance from the primary controller device, then the primary controller device may initiate pairing between all the other unpaired controller devices within the predetermined distance, or may provide information related to the other unpaired controller devices to a user via an application running on, for example, a mobile computing device (e.g., a mobile phone). The user may then select a device to be paired from a list of the other unpaired controller devices within the application.

As another example, a controller device of the bicycle (e.g., the rear derailleur) may determine the distance between the controller device and an unpaired controller device located off of the bicycle using distance sensors of the controller device and the unpaired controller device, respectively. In one embodiment, the unpaired controller device is located on another bicycle, and the controller device determines the distance to the unpaired controller device of the other bicycle, and reports (e.g., displays) the determined distance to the user. In another embodiment, the controller devices determines the distance to the unpaired controller device of the other bicycle a plurality of times over a time period, such that a relative speed of the other bicycle may be determined, tracked over the time period, and reported to the user. In yet another embodiment, instead of reporting the determined distance to the user, the controller device alerts the user when the unpaired controller device of the other bicycle enters or leaves a distance threshold. In another embodiment, the unpaired controller device is in a location that is fixed relative to a surface on which the bicycle is being ridden, and the controller device reports the determined distance to the fixed unpaired controller device to the user. For example, bicycle race operators or mountain bike trail builders may install fixed location unpaired controller devices along a course, and the controller device reports the determined distance to each fixed location unpaired controller device (e.g., respectively when in range).

As yet another example, each controller device on a bicycle may measure a distance and direction (e.g., angle) to every other controller device on the bicycle using distance sensors. Using this orientation data, bicycle dynamics may be measured. In one embodiment, the distance and direction from a fixed controller device (e.g., relative to a frame of the bicycle; a portion of the electronic rear derailleur) may be used to measure a steering angle of a front wheel based on the distance and direction from the fixed controller device to controller devices mounted to a handlebar of the bicycle (e.g., dynamic controller devices relative to the frame of the bicycle; shifting devices). In another embodiment, a controller device is located on each suspension component of the bicycle, and while the user is riding, suspension dynamics such as travel and rebound may be calculated by recording the distance and direction from each fixed controller device to each controller device mounted to the suspension components of the bicycle.

A significant advantage of the disclosed bicycle component control is that pairing of electrical components on a bicycle may be accomplished without user intervention. In other words, the user does not have to go through the traditional pairing process of pressing multiple physical buttons on a number of devices in a specific order, for example, to pair the electrical components on the bicycle. This provides for a better user experience and decreases the time required for the pairing process. An advantage of the disclosed bicycle component communication based on ultra-wideband radio is that distances from a bicycle to components on the bicycle, components on other bicycles, and/or other fixed components off the bicycle for different applications may be determined and reported to a user in a cost effective way.

Wireless communication between components is described herein. Although the present specification describes components and functions that may be implemented in particular wireless communication embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

In an embodiment, components of the bicycle described herein will communicate with each other. In the case of wireless communication, the components will initially be paired so as to allow secure communication between components on the bicycle without interference from devices not associated with the system. One or more of the components may also be paired with a separate device such as a computer, tablet, or phone (e.g., a mobile computing device). This paired device may provide the user interface to allow the user to communicate with the components on the bicycle. Examples of communication are updating firmware, setting variables, and running diagnostic tools and analysis.

FIG. 1A illustrates a right side view of an example road bicycle 100. The bicycle 100 includes a frame 102, a front wheel 104, a rear wheel 106, and a drivetrain 108. The front wheel 104 and the rear wheel 106 are rotatably coupled to the frame 102. The bicycle 100 includes a front brake 110 for braking the front wheel 104 and a rear brake 112 for braking the rear wheel 106. To allow a user to steer the bicycle 100, the bicycle 100 includes a handlebar assembly 114 attached to the frame 102.

Figure 1B:
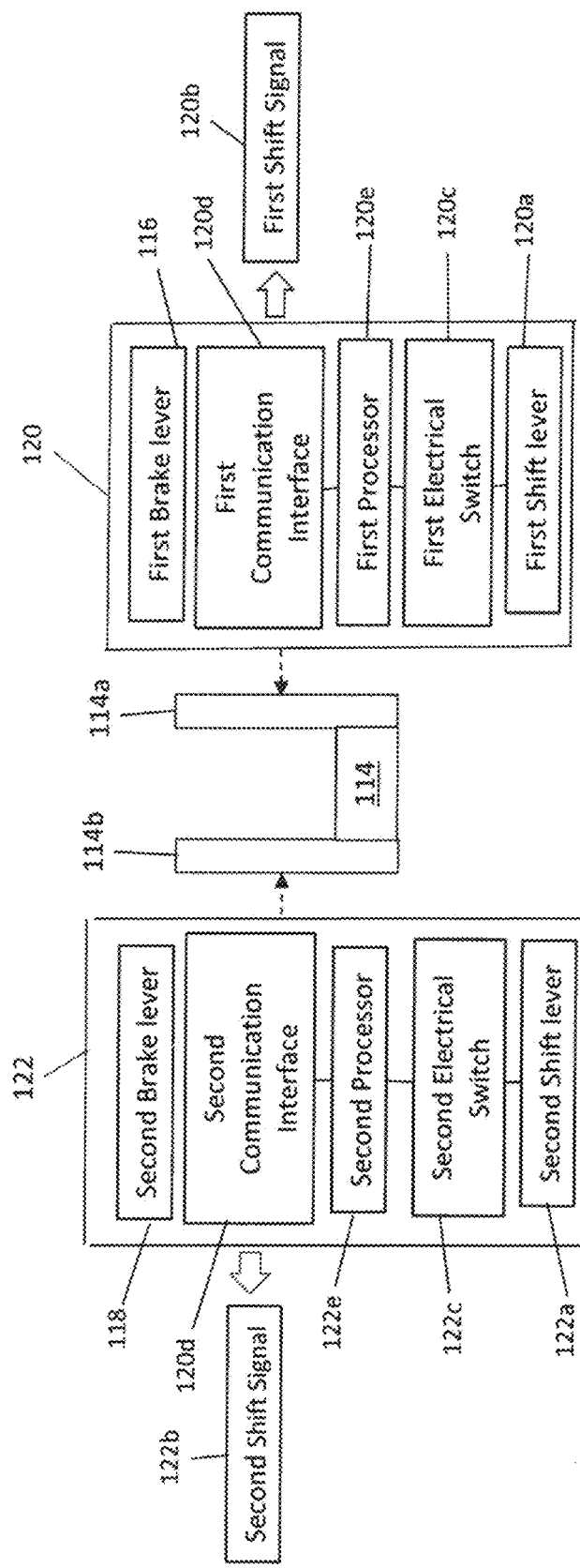
FIG. 1B is a schematic diagram of a handlebar assembly of the example road bicycle shown in FIG. 1A, and other components coupled to the handlebar assembly.

FIG. 1B illustrates a schematic diagram depicting the handlebar assembly 114 and other components coupled to the handlebar assembly 114. As shown in FIG. 1A and/or FIG. 1B, the handlebar assembly 114 includes a right drop bar 114*a* and a left drop bar 114*b* to accommodate the right hand and the left hand of the user, respectively. The bicycle 100 includes a first or right controller device 120 coupled to the right drop bar 114*a*. The first controller device 120 includes a first or right brake lever 116 to allow the user to operate the rear brake 112. Correspondingly, the bicycle 100 includes a second or left controller device 122 coupled to the left drop bar 114*b*. The second controller device 122 includes a second or left brake lever 118 to allow the user to operate the front brake 110.

Figure 1C:
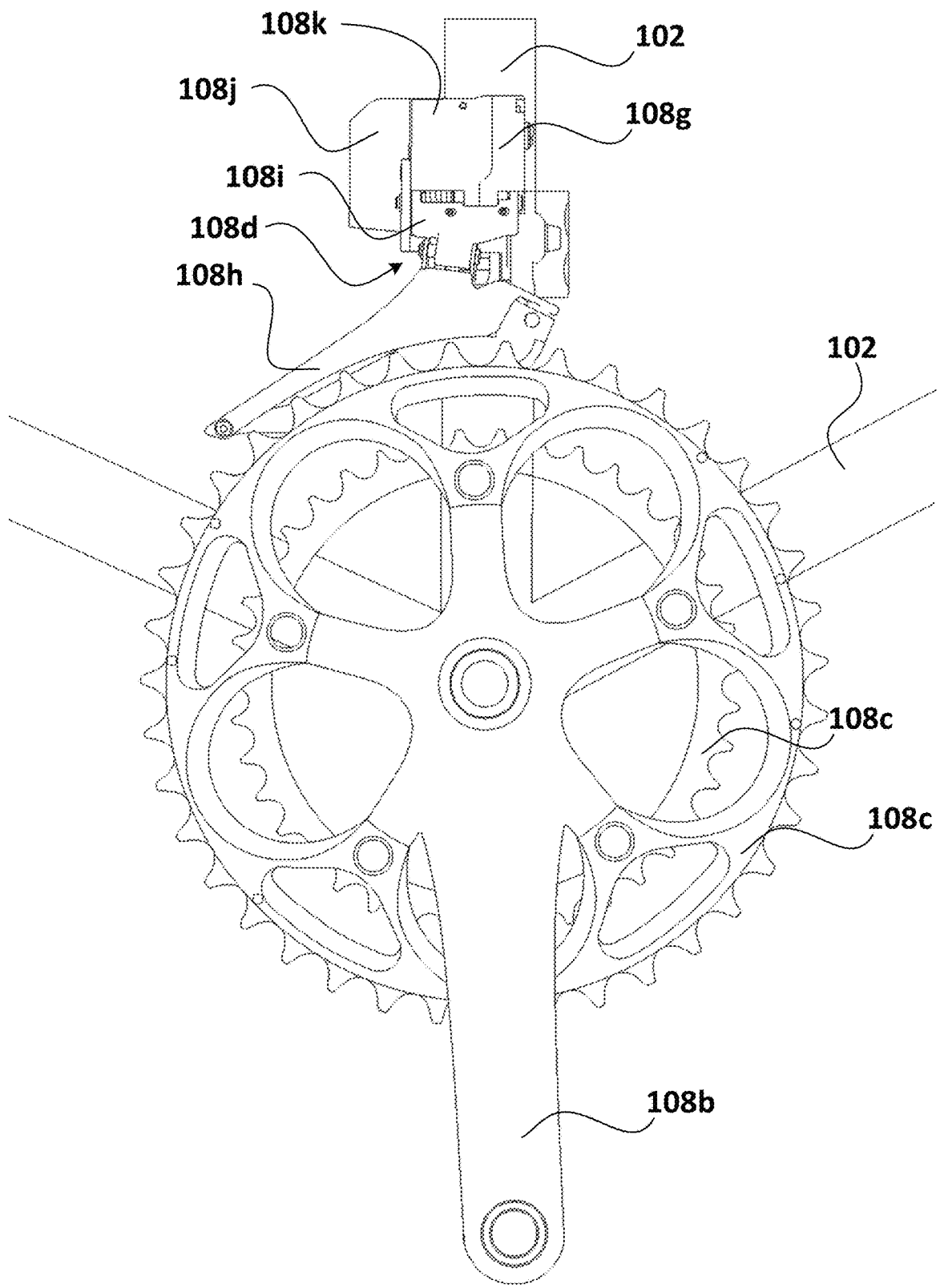
FIG. 1C is a side view of a front derailleur of an example road bicycle.
Figure 1D:
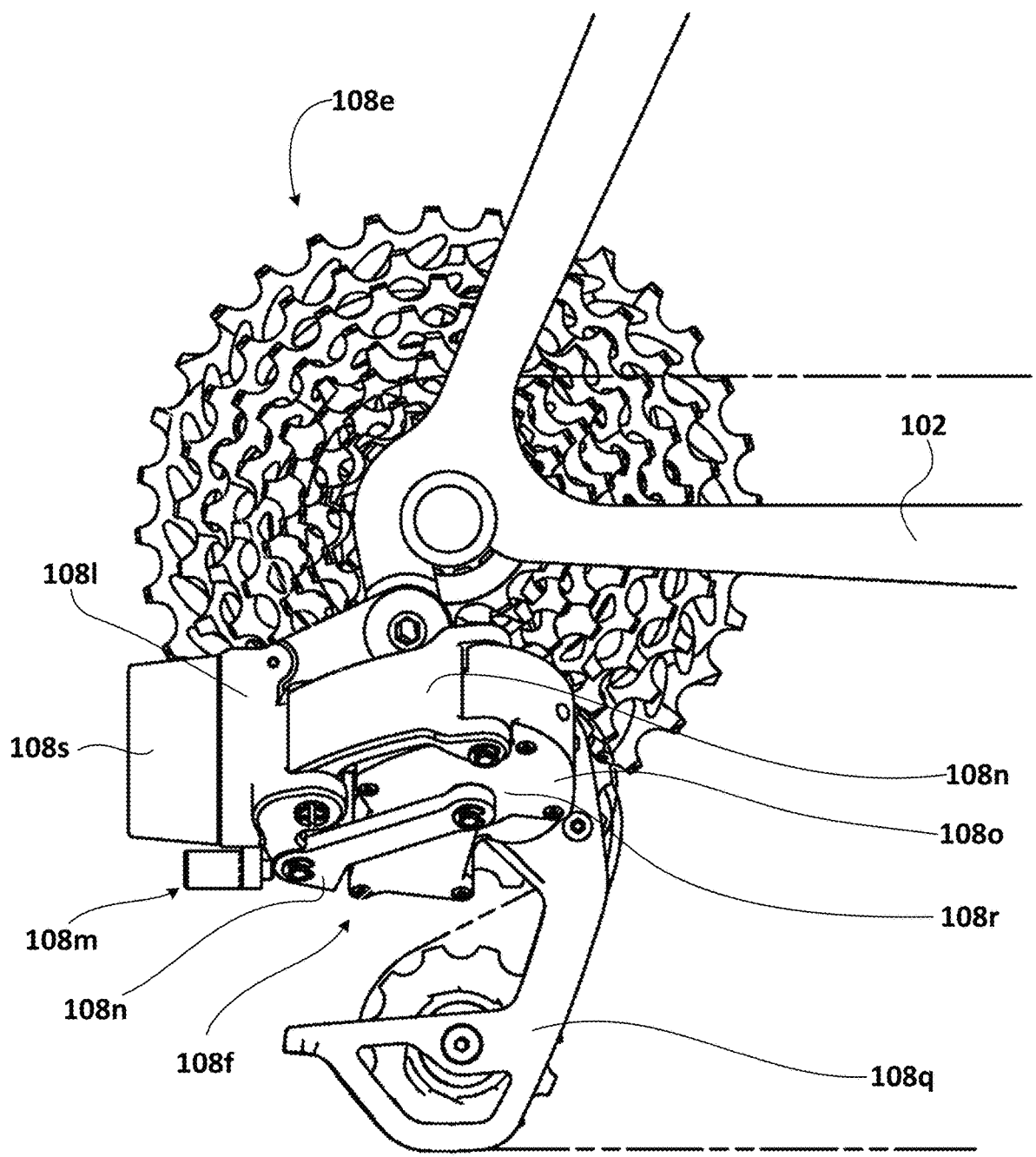
FIG. 1D is a side view of a rear derailleur of the example road bicycle shown in FIG. 1.

As shown in FIGS. 1A, 1C, and 1D, the drivetrain 108 includes a drive chain 108*a*, a front crank 108*b*, one or more front chainrings 108*c*, a front gear changer such as an electromechanical front derailleur 108*d*, rear sprockets 108*e*, and a rear gear changer such as an electromechanical rear derailleur 108*f*. The front chainrings 108*c* are coupled to the front crank 108*b*. Diameters and numbers of teeth on the front sprockets 108*c* may differ from each other. The rear sprockets 108*e* are coaxially mounted to the rear wheel 106. Diameters and numbers of teeth on the rear sprockets 108*e* may decrease from left to right. Alternatively, the diameters and the numbers of teeth on the rear sprockets 108*e* may decrease from right to left. The chain 108*a* engages a selected chainring 108*c* and a selected sprocket 108*e*.

To drive the bicycle 100, the user may pedal to rotate the front crank 108*b* relative to the frame 102. Rotation of the front crank 108*b* causes the selected chainring 108*c* to rotate and the chain 108*a* to move through the drivetrain 108. Movement of the chain 108*a* causes corresponding rotation of the selected sprocket 108*e* and thus the rear wheel 106. Rotation of the rear wheel 106 against the ground may propel the bicycle 100 in a forward direction. The front and/or forward orientation and movement of the bicycle 100 is indicated by the direction of arrow "A." Further, other terms relating to direction may be used herein. For example, the "inboard" and "outboard," and "left" and "right" may be used. The terms "right" and "left," and "inboard" and "outboard" describe a position between parts or items and a vertical plane substantially bisecting the bicycle or a direction toward or away from the vertical plane substantially bisecting the bicycle. Moreover, terms such as "front" and "rear" referred to bicycle mechanisms conventionally mounted to the bicycle and with the bicycle oriented in the forward direction.

The selected chainring 108*c* and the selected sprocket 108*e*, in combination, determine a gear ratio for driving the bicycle 100. Operation of the front derailleur 108*d* allows the user to change the selected chainring 108*c* engaged by the chain 108*a*. For example, the front derailleur 108*d* may be actuated to shift the chain 108*a* left or right from one chainring 108*c* to the other. The front derailleur 108*d* is shown as a wireless electrically-actuated front derailleur mounted to the frame 102. The front derailleur 108*d* may include a base member 108*g* mounted to the bicycle frame 102 and a chain guide assembly 108*h* or cage movably connected to the base member 108*g* by a front linkage 108*i* in the form of a parallelogram. A front power supply 108*j* (e.g., a removable battery) may be mounted on the front derailleur 108*d*. The front power supply 108*j* may supply power to a front motor unit 108*k*. The front motor unit 108*k* is configured to supply torque to the components of the front derailleur 108*d* to move the chain guide assembly 108*h* relative to the front base member 108*g* such that the front derailleur 108*d* may shift the chain 108*a* between the front sprockets 108*c*.

Operation of the rear derailleur 108*f* allows the user to change the selected sprocket 108*e* engaged by the chain 108*a*. For example, the rear derailleur 108*f* may be actuated to shift the chain 108*a* left or right from one sprocket 108*e* to another. The rear derailleur 108*f* is shown in FIGS. 1A and 1D as a wireless electrically-actuated rear derailleur mounted to the frame 102. The rear derailleur may include a base member 108*l* (e.g., a b-knuckle) that is mounted to the bicycle frame 102. A linkage 108*m* may include two links 108*n* that are pivotally connected to the base member 108*l*. A movable member 108*o* (e.g., a p-knuckle) may be connected to the linkage 108*m*. A chain guide assembly 108*q* or cage may be configured to engage and maintain tension in the chain 108*a* and may be pivotally connected to a part of the movable member 108*o*.

A motor unit 108*r* and rear power supply 108*s* (e.g., a removable battery) are disposed on the rear derailleur 108*f*. The battery 108*s* supplies power to the motor unit 108*r*. In this embodiment, the motor unit 108*r* is disposed in the movable member 108*o*. Alternatively, the motor unit 108*r* may be disposed in one of the links 108*n* or in the base member 108*l*. The motor unit 108*r* may include a motor and a gear transmission. The motor unit 108*r* may be coupled with the linkage 108*m* to laterally move the cage 108*q* and thus shift the chain 108*a* among the rear sprockets 108*e*.

Figure 1E:
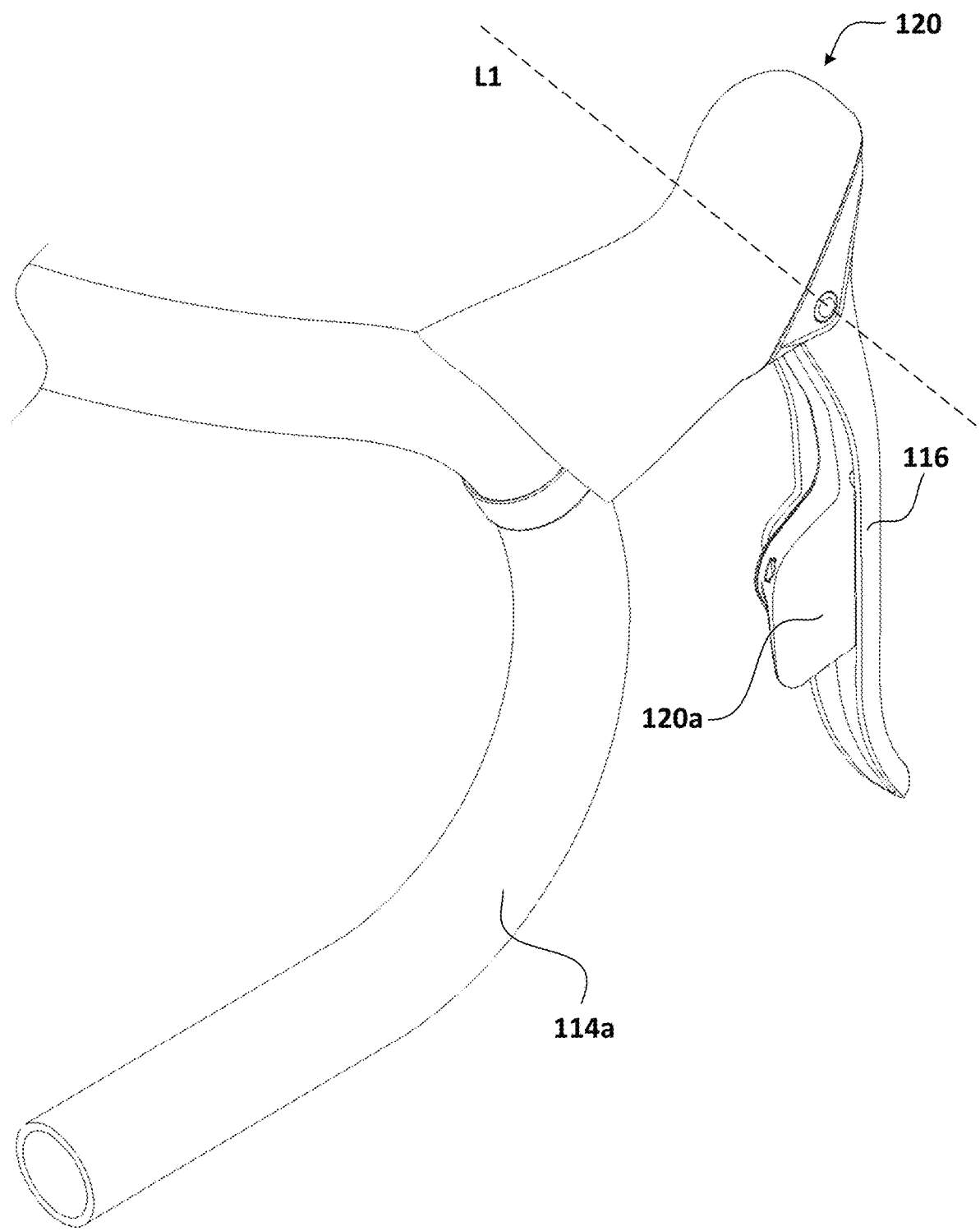
FIG. 1E is a side view of a right controller device of the example road bicycle shown in FIG. 1A coupled to a right drop bar.

Referring to FIGS. 1A, 1B, and 1E, to allow the user to operate the front derailleur 108*d* or the rear derailleur 108*f*, the first controller device 120 and the second controller device 122 include a first electrical switch 120*c* and a second electrical switch 122*c*, respectively. The first electrical switch 120*c* and the second electrical switch 122*c* are actuated by a first input element and a second input element, respectively (e.g., the first shift lever 120*a* and the second shift lever 122*a*, respectively; actuators). The first shift lever 120*a* is configured to receive a right input from the right hand of the user and actuate the first electrical switch 120*c*. The second shift lever 122*a* is configured to receive a left input from the left hand of the user and actuate the second electrical switch 122*c*. The first shift lever 120*a* may be positioned behind the first brake lever 116, while the second shift lever 122*a* may be positioned behind the second brake lever 118.

To provide the right input to the first shift lever 120*a*, the user may manually apply pressure on the right side of the first shift lever 120*a*. In response, the first shift lever 120*a* may pivot about a first shift lever axis L1 from an initial rest position to a shift actuation position. The first shift lever 120*a* may be biased with a spring or the like so that when the manual pressure is no longer applied by the user, the first shift lever 120*a* returns to the initial rest position. Similarly, to provide the left input to the second shift lever 122*a*, the user may manually apply pressure on the left side of the second shift lever 122*a*. In response, the second shift lever 122*a* may pivot about a second shift lever axis L2 (not shown) from an initial rest position to a shift actuation position. The second shift lever 122*a* may be biased with a spring or the like so that when the manual pressure is no longer applied by the user, the second shift lever 122*a* returns to the left starting position.

The first controller device 120 and the second controller device 122 include a first controller processor 120*e* and a second controller processor 122*e*, respectively, that electronically process the manual input received by the first shift lever 120*a* and the second shift lever 122*a*, respectively. For example, the right input triggers a first controller communication interface 120*d* to wirelessly send a first shift signal 120*b*, and the left input triggers a second controller communication interface 122*d* to wirelessly send a second shift signal 122*b*. Correspondingly, the front derailleur 108*d* and the rear derailleur 108f include communication interfaces and processors that are configured to receive and electronically process the first shift signal 120b and/or the second shift signal 122b to determine a designated response.

In a first scenario, the user provides the right input via the first shift lever 120a but does not provide the left input via the second shift lever 122a. In response, the first controller device 120 sends the first shift signal 120b, while the left controller device 122 sends no signal. When the rear derailleur 108f receives the first shift signal 120b with no second shift signal 122b, the rear derailleur 108f shifts the chain 108a to engage the next smaller sprocket 108e to the right or performs a downshift. Meanwhile, when the front derailleur 108d receives the first shift signal 120b with no second shift signal 122b, the front derailleur 108d remains idle.

In a second scenario, the user provides the left input via the second shift lever 122a but does not provide the right input via the right shift lever 120a. In response, the second controller device 122 sends the second shift signal 122b, while the first controller device 120 sends no signal. When the rear derailleur 108f receives the second shift signal 122b with no first shift signal 120b, the rear derailleur 108f shifts the chain 108a to engage the next larger sprocket 108e to the left or performs an upshift. Meanwhile, when the front derailleur 108d receives the second shift signal 122b with no second shift signal 120b, the front derailleur 108d remains idle.

In some embodiments, the user may manually apply pressure to the first shift lever 120a and/or the second shift lever 122a for varying amounts of time. For example, without applying pressure to the second shift lever 122a, the user may apply continuous pressure to keep the first shift lever 120a in the left final position for a period that exceeds a threshold amount of time (e.g., one second). In response, the first controller device 120 sends the first shift signal 120b for a corresponding amount of time (e.g., until the user releases the pressure on the first shift lever 120a). When the rear derailleur 108f receives the first shift signal 120b, the rear derailleur 108f may determine that the first shift signal 120b exceeds a threshold amount of time. In response, rather than merely shifting the chain 108a to engage the next sprocket 108e to the right, the rear derailleur 108f shifts the chain 108a repeatedly over multiple sprockets 108e to the right until the user releases the pressure on the first shift lever 120a and the first shift signal 120b ceases, or until the chain 108a reaches the right-most sprocket 108e. Alternatively, to shift the chain 108a repeatedly over multiple sprockets 108e to the left, the user may apply continuous pressure to the left shift lever 122a for a period that exceeds the threshold amount of time.

As shown in FIGS. 1A and 1B, the first controller device 120 and the second controller device 122 employ the first shift lever 120a and the second shift lever 122a as respective input elements to generate corresponding wireless shift signals 120b, 122b (e.g., including messages and/or message packets) to actuate the front derailleur 108d and the rear derailleur 108f. Alternative embodiments, however, may include controller devices with different configurations to control a front derailleur and/or a rear derailleur. For example, a bicycle may include aerobars with pushbuttons instead of drop bars with shift levers, where the pushbuttons act as input elements that may be pressed by the user to generate wireless signals that may be received and processed by the front derailleur and the rear derailleur. Also, while some controller devices may be coupled to handlebar assemblies, other controller devices may be coupled to other areas of a bicycle, such as locations throughout the frame. Further, other types of controller devices are contemplated. For example, a unified shifter device may be employed, where the user may press one or more pushbuttons on a mounted box to send signals that control the front derailleur and/or the rear derailleur. Alternatively, a pedal sensor may be employed to receive input from the user via pedaling action by the user, and the front derailleur and/or the rear derailleur may respond to a signal from the pedal sensor (e.g., select gears to maintain a desired cadence or pedal resistance).

Figure 2A:
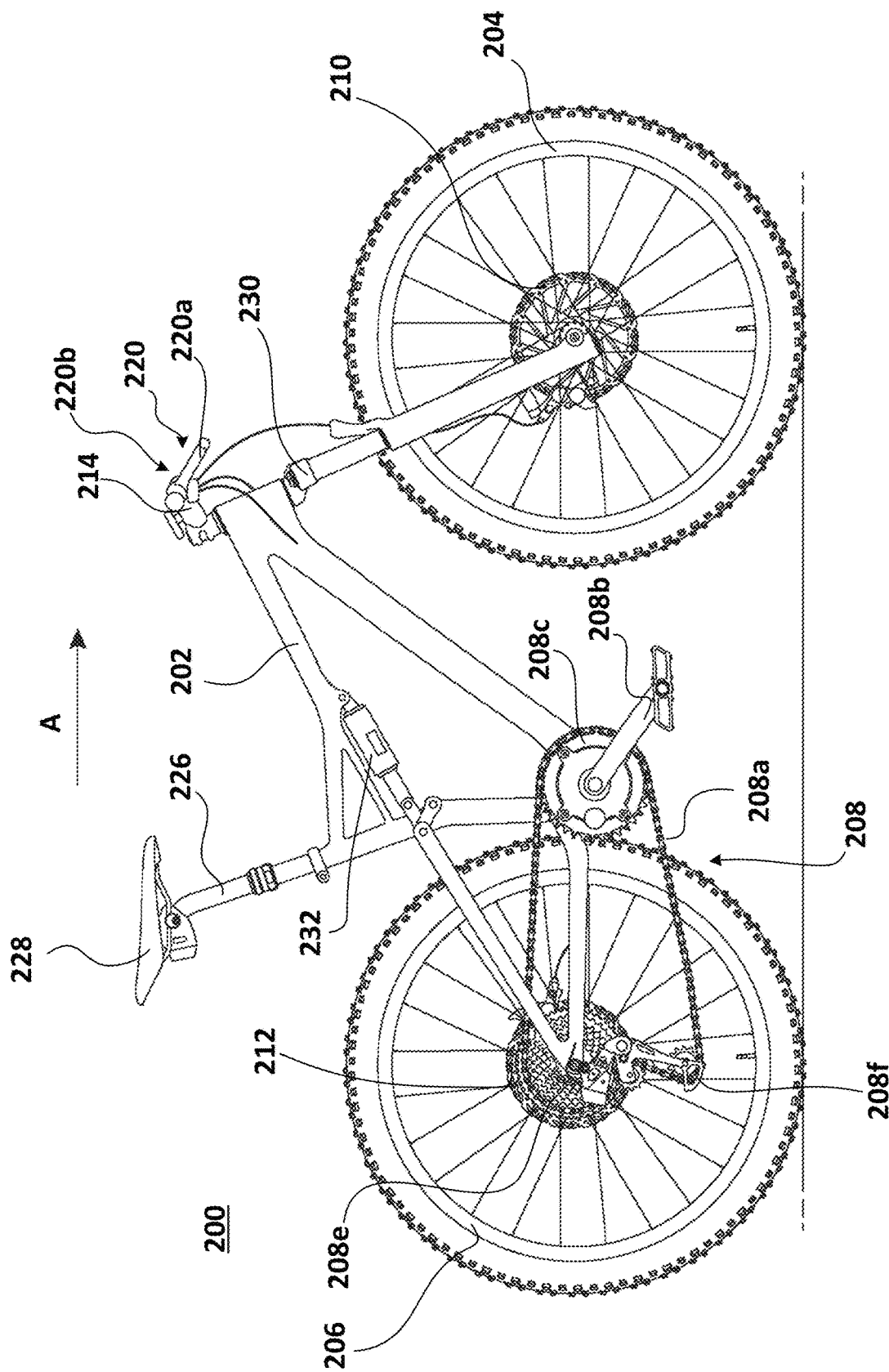
FIG. 2A is a right-side view of an example mountain bicycle that may implement aspects of the present disclosure.

While the example bicycle 100 shown in FIGS. 1A and 1B is a road bicycle, aspects of the present disclosure may be implemented with bicycles of any type. For example, FIG. 2A illustrates a right side view of an example mountain bicycle 200. In some cases, the bicycle 200 may be an e-bike. The bicycle 200 includes a frame 202, a front wheel 204, a rear wheel 206, a drivetrain 208, front disk brakes 210, and rear disk brakes 212. The drivetrain 208 includes a chain 208a, a front crank 208b, a front chainring 208c, rear sprockets 208e, and a rear derailleur 208f, which operate in a manner similar to the corresponding components of the drivetrain 108 described above.

In contrast to the bicycle 100, the bicycle 200 includes other operating-enacting devices such as a height-adjustable seat post assembly 226, a front suspension system 230 (e.g., a front suspension assembly), and a rear suspension system 232 (e.g., a rear suspension assembly). In FIGS. 2A and 2C, the seat post assembly 226 is a wireless, electrically-actuated seat post assembly 226 that allows a position of a seat 228 (e.g., a saddle) to be dynamically adjusted. For example, the adjustable seat post 226 may include an operable valve (not shown) that allows the seat 228 to be dropped to a lower height during a ride to change the position of the user (e.g., a rider) relative to the frame 202 and achieve better handling. The seat post assembly 226 includes a first or lower tube 226a and a second or upper tube 226b (e.g., two tubes). The two tubes 226a, 226b are movable relative to each other to establish a height of the seat 228 relative to the frame 202. A head 226c is fixed to a top of the second tube 226b. A seat post motor unit 226d is mounted to the head 226c, and a power supply 226e (e.g., a removable battery) is attached to the motor unit 226d. The motor unit 226d may include a motor and a gear transmission. The seat post power supply 226e may supply power to the seat post motor unit 226d. The seat post motor unit 226d is configured to supply torque to the components of the seat post assembly 226 to open and close the operable valve.

The front suspension system is shown as a wireless, electrically-actuated front suspension system 230 that allows the suspension characteristics at the front wheel 204 to be dynamically adjusted. Further, the rear suspension system is shown as a wireless, electrically-actuated rear suspension system 232 that allows suspension characteristics at the rear wheel 206 to be dynamically adjusted. The front suspension system 230 and the rear suspension system 232 may further include power supplies such as batteries that supply power to a front suspension motor unit and a rear suspension motor unit, respectively. The front suspension motor unit and the rear suspension motor unit may be configured to supply torque to the components of the front suspension system 230 and the rear suspension system 232, respectively, to open and close one or more valves to change various suspension characteristics.

Figure 2B:
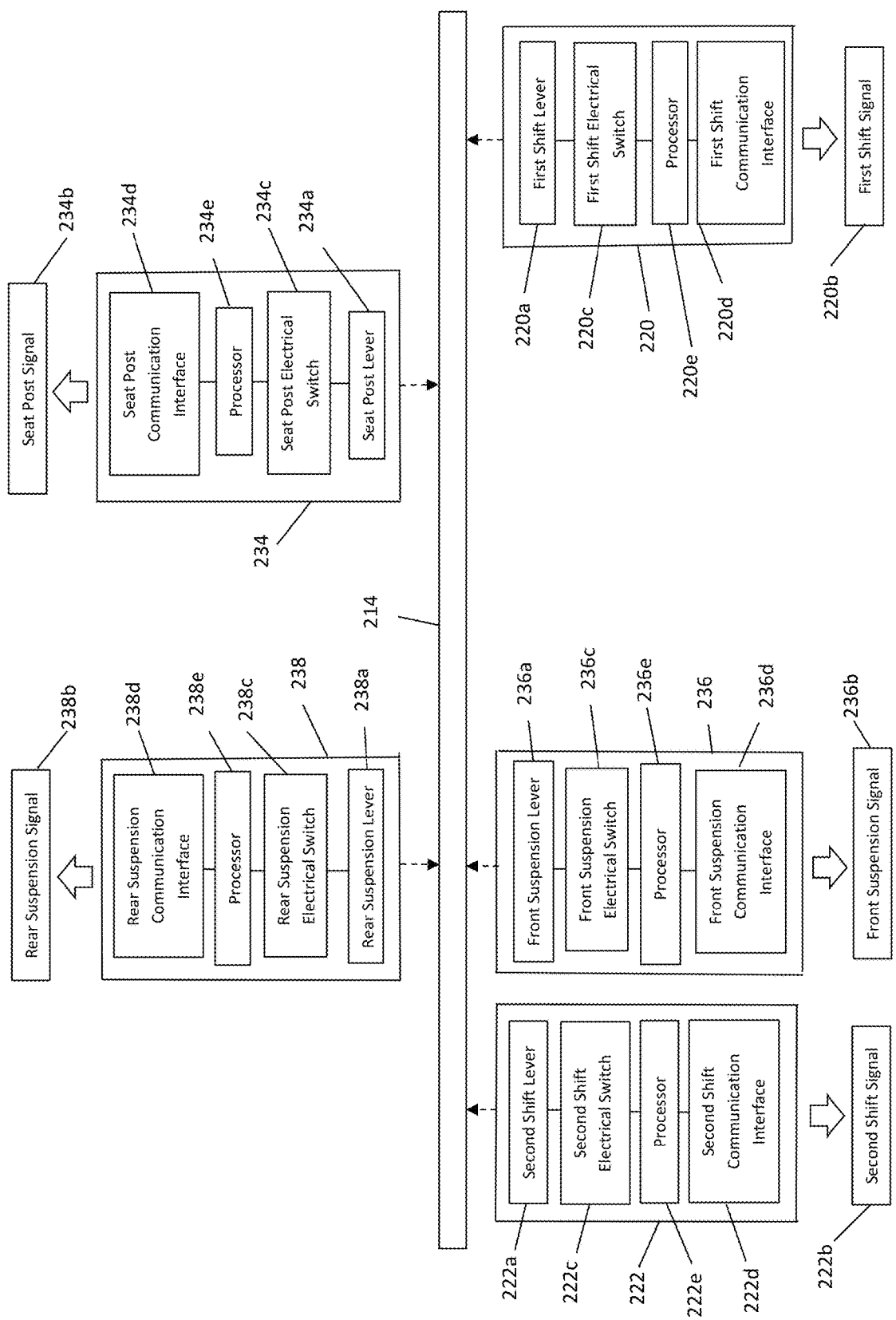
FIG. 2B is a schematic diagram of a handlebar assembly of the example mountain bicycle shown in FIG. 2A, and other components coupled to the handlebar assembly.
Figure 2C:
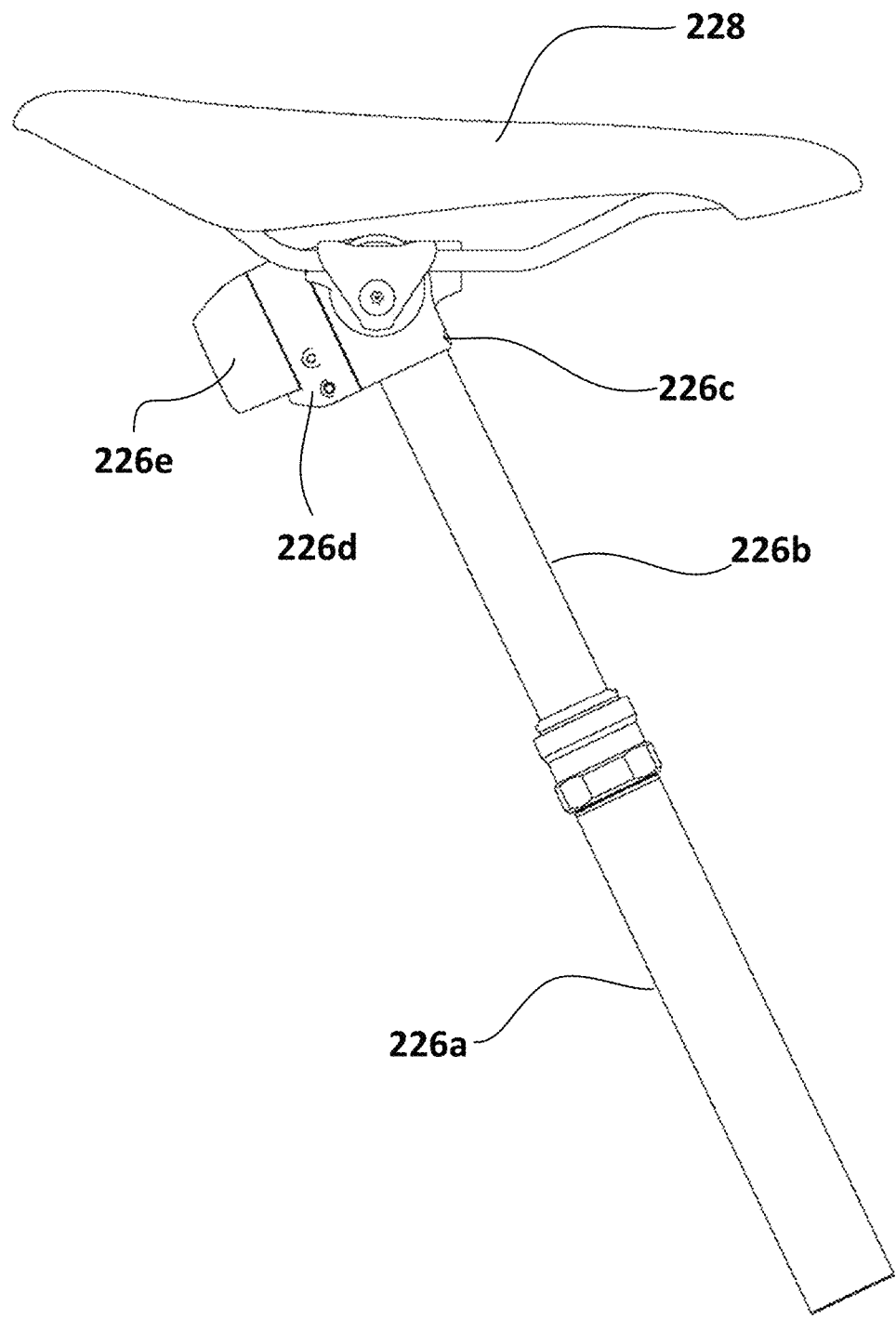
FIG. 2C is a side view of a seat post assembly, with a saddle installed thereon, of the example mountain bicycle shown in FIG. 2A.

Referring to FIGS. 2A and 2B, the bicycle 200 includes a first or right controller device 220 and a second or left controller device 222. The first controller device 220 and the second controller device 222 include a first electrical switch 220c and a second electrical switch 222c, respectively, that are actuated by a first input element and a second input element, respectively (e.g., a first shift lever or button 220a and a second shift lever or button 222a, respectively; actuators). The handlebar assembly 214 includes a flat bar or a riser bar instead of drop bars. As such, the first controller device 220 is coupled to a right side of the flat or riser bar, and the second controller device 222 is coupled to a left side of the flat or riser bar. Additionally, the bicycle 200 may include a seat post controller device 234, a front suspension controller device 236, and a rear suspension controller device 238 coupled to the handlebar assembly 214. In other embodiments, one or more of the controller devices (e.g., the first controller device 220 and the seat post controller device 234) may be formed by a single controller device (e.g., a single lever or button).

The user may operate the first shift lever 220a and/or the second shift lever 222a as described above to generate a first shift signal 220b and/or a second shift signal 222b, respectively. Similar to the bicycle 100, the first shift signal 220b and/or the second shift signal 222b may be employed to control the rear derailleur 208f. To allow the user to adjust the height of the seat post assembly 226, the seat post controller device 234 includes a seat post electrical switch 234c that is actuated by a seat post input element 234c such as a lever or button.

To allow the user to adjust the characteristics of the front suspension system 230 and the rear suspension system 232, the front suspension controller device 236 and the rear suspension controller device 238 include a front suspension electrical switch 236c and a rear suspension electrical switch 238c that are actuated by suspension input elements 236a, 238a, respectively, such as levers or buttons. Alternatively, the adjustable seat post assembly 226, the adjustable front suspension system 230, and the adjustable rear suspension system 232 may also be configured to receive the first shift signal 220b and/or the second shift signal 222b, so that these devices may also be controlled by operation of the first shift lever 220a and/or the second shift lever 222a.

The seat post controller device 234, the front suspension controller device 236, and the rear suspension controller device 238 include processors 234e, 236e 238e, respectively, that electronically process the manual input received by the seat post input element 234a, the front suspension input element 236a, and the rear suspension input element 238a, respectively. The seat post input triggers a seat post controller communication interface 234d to wirelessly send a seat post signal 234b. The front and rear suspension inputs trigger front and rear controller communication interfaces 236d, 238d, respectively, to wirelessly send a front suspension signal 236b and a rear suspension signal 238b, respectively. Correspondingly, the seat post assembly 226 includes a communication interface and a processor that is configured to receive and electrically process the seat post signal 234b to determine a designated response. The front and rear suspensions include communication interfaces and processors that are configured to receive and electronically process the front suspension signal 236b and the rear suspension signal 238b, respectively, to determine a designated response.

FIGS. 1A-1E and 2A-2C illustrate how various controller devices may be employed to wirelessly communicate control signals to different combinations of operation-enacting devices. The signals from the controller devices may be communicated wirelessly using any technique, protocol, or standard. For instance, Institute of Electrical and Electronics Engineers ("IEEE") 802.11 standards, IEEE 802.15.1 or BLUETOOTH® standards, and/or ANT™ or ANT+™ standards may be used. In some embodiments, however, control signals may be communicated wirelessly over a proprietary protocol, such as one that operates on top of the physical layer of the IEEE 802.15.4 wireless protocol.

Figure 3:
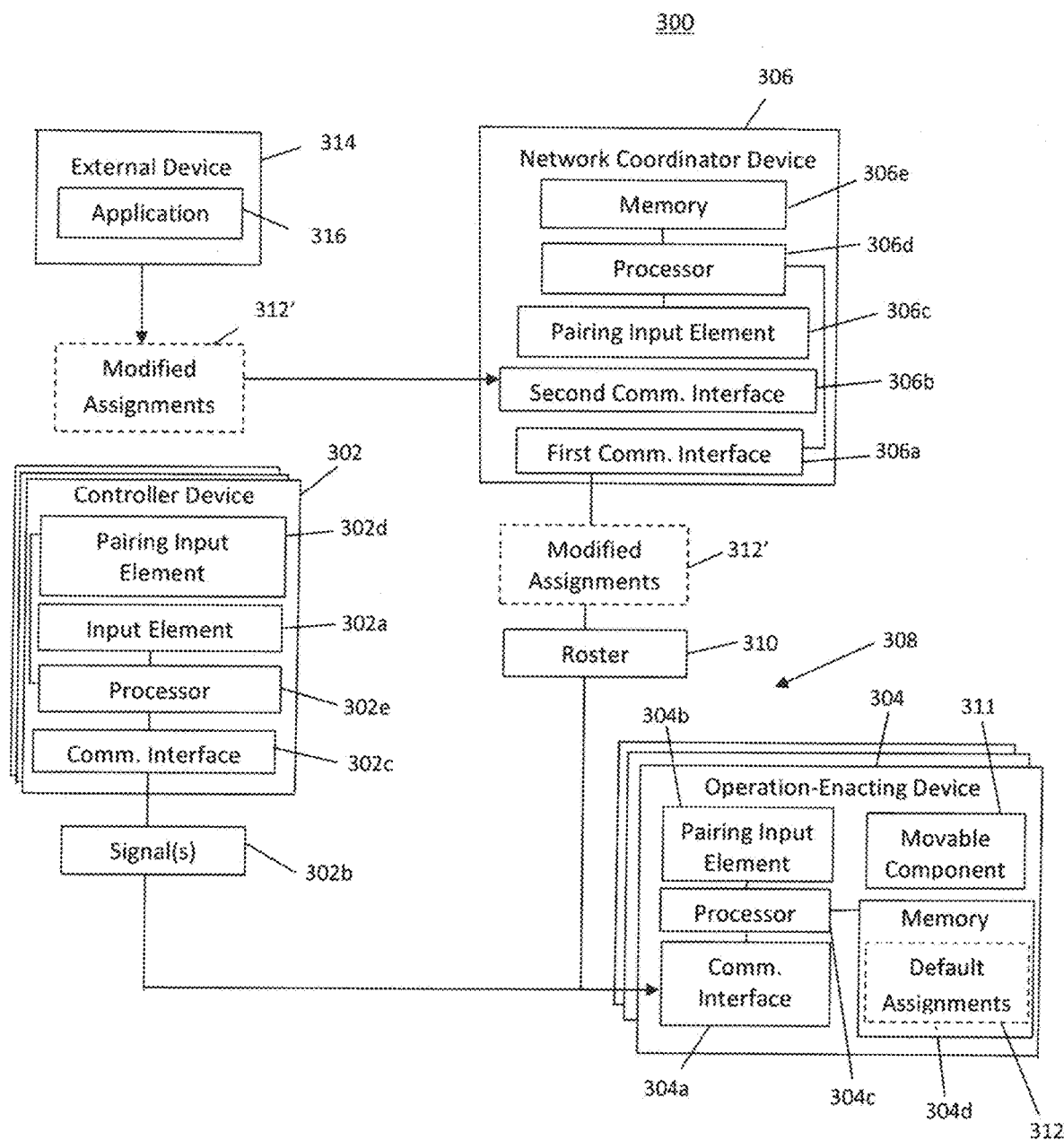
FIG. 3 illustrates an example system for controlling different combinations of operation-enacting devices on a bicycle, according to aspects of the present disclosure.

FIG. 3 illustrates an example system 300 for controlling different combinations of operation-enacting devices on a bicycle. The system 300 includes a plurality of controller devices 302. Each controller device 302 includes at least one respective input element 302a configured to receive input from a user. For example, as described above, the controller devices 302 may include a right controller device and a left controller device coupled to a handlebar assembly, where respective shifter levers act as input elements 302a. In general, input elements 302a may include any variety of shifter, pushbutton, clicker, switch, other toggled device, sensor (e.g., peddling sensor, etc.), or the like. A single controller device 302 may also include more than one input element 302a (e.g., two shifter levers, a plurality of pushbuttons, etc.). In one embodiment, at least some controller devices of the plurality of controller devices 302 do not include an input element.

Each controller device of the plurality of controller devices 302 may include one or more additional components. For example, a respective controller device 302 may include a processor 302e, a communications interface 302c, and/or a memory. The plurality of controller devices 302 are configured to transmit to, for example, a plurality of operation-enacting devices 304, signals 302b (e.g., data streams including messages and/or message packets) indicating input received by the input elements 302a of the controller devices 302. For example, the first controller device 120 and the second controller device 122 may wirelessly transmit a first shift signal 120b and a second shift signal 120a as described above to indicate input received by the first shift lever 120a and the second shift lever 122a, respectively. The communications interface 302c may be or include any number of different types of transmitters. For example, the communications interface 302c may be or include a combined transmitter and receiver.

The system 300 also includes the plurality of operation-enacting devices 304, where each operation-enacting device 304 is configured to enact at least one respective operation on the bicycle. For example, the operation-enacting devices 304 may include a front derailleur, a rear derailleur, a height-adjustable seat post assembly, a front suspension system, and/or a rear suspension system, as described above. Each operation-enacting device 304 may include at least one movable component 311 configured to modify an operative state of the bicycle. Each operation-enacting device of the plurality of operation-enacting devices 304 includes a processor 304c and may include a memory 304d. At least some operation-enacting devices 304 of the plurality of operation-enacting devices 304 may be or include controller devices 302, respectively.

In some cases, an operation-enacting device 304 may act on more than one component of the bicycle in a single operation. In other cases, a single operation may include more than one act on one or more components of the bicycle. In yet other cases, the operation may include a physical action and a wireless action, where the wireless action sends wireless signals to cause further action by other cooperative device(s).

The system 300 also includes a network coordinator device 306. The network coordinator device 306 includes a first communication interface 306a configured to communicate wirelessly with the controller devices 302 and the plurality of operation-enacting devices 304. Using the first communication interface 306a, the network coordinator device 306 may establish a wireless network 308 that enables communications between the network coordinator device 306, the controller devices 302, and the plurality of operation-enacting devices 304. Correspondingly, each controller device 302 includes a communication interface 302c and each operation-enacting device 304 includes a communication interface 304a for communicating with other devices (e.g., receiving and transmitting data/signals) on the wireless network 308. Each of the communication interfaces 304 may be or include any number of different types of receivers. In one embodiment, each of the communication interfaces 304 is or includes a combined transmitter and receiver. The network coordinator device 306 further includes a processor 306d and may include a memory 306e.

In the embodiment shown in FIG. 3, the network coordinator device 306 further includes a second communication interface 306b configured to communicate wirelessly with an external computing device 314, such as a smart phone, a computing tablet, a laptop, a personal computer, or the like. Using the second communication interface 306b, the network coordinator device 306 may establish a wireless network 308 that enables communications between the network coordinator device 306 and the external computing device 314. The external computing device 314 may include an application 316, such as a mobile application or other computer software.

Although the network coordinator device 306 may appear in FIG. 3 as a separate device, the features of a network coordinator device 306 in alternative embodiments may be provided by one or more of the other controller devices 302 and/or operation-enacting devices 304 such as a rear derailleur.

The processors 302e, 304c, 306d, for example, of the system 300 may include a general processor, digital signal processor, an application specific integrated circuit (ASIC), field programmable gate array (FPGA), analog circuit, digital circuit, combinations thereof, or other now known or later developed processor. The processor may be a single device or combinations of devices, such as through shared or parallel processing.

The memory 304d, 306e, for example, of the system 300 may be any number of different types of memory. For example, such memory may be a volatile memory or a non-volatile memory. The memory may include one or more of a read only memory (ROM), random access memory (RAM), a flash memory, an electronic erasable program read only memory (EEPROM), or other type of memory. The memory may be removable from the corresponding device, such as a secure digital (SD) memory card. Computer memory includes any one or more of a computer-readable medium and other equivalents and successor media, in which data or instructions may be stored. In general, a computer-readable medium includes any medium that is capable of storing, encoding or carrying a set of instructions for execution by a processor or that cause a computer system to perform any one or more of the methods or operations disclosed herein.

To power wireless communications and computer processing, the system 300 may include power supplies, which may be stored internal to the operating device or stored external to the operating device. The power supply may include a combination of multiple batteries or other power providing devices. Specially fitted or configured battery types, or standard battery types such as CR 2012, CR 2016, and/or CR 2032 may be used. In some embodiments, the devices in a system are all individually powered (e.g., by a dedicated battery).

As described above, the embodiments employ communication interfaces (e.g., communication interfaces 302c, 304a, 306a, and 306b). Such communication interfaces are configured to send data such as control signals and/or commands to bicycle components.

The communication interface provides for wireless communications in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustration or other representation of devices, such as the network coordinator devices 306, the controller devices 302, and the operation-enacting devices 304, include (even if not expressly labeled) any combination of processor(s), memory device(s) (e.g., computer-readable media storing program instructions for execution by processor(s)), sensor(s), communication interface(s), and power supply necessary to achieve the disclosed features.

At least some controller devices 302 of the plurality of controller devices 302, at least some operation-enacting devices of the plurality of operation-enacting device 304, and the network coordinator device 306 are paired into the wireless network 308, and a roster 310 is defined by the controller devices 302 and the operation-enacting devices 304 that have been paired to the wireless network 308 at the end of a pairing session.

By fixing the roster 310, the system 300 only includes the devices 302, 304 selected by the user and/or automatically paired into the system 300. The controller devices 302, the operation-enacting devices 304, and the network coordinator device 306 may be paired into the wireless network 308 using pairing input elements 302d, pairing input elements 304b, and pairing input element 306c, respectively. The pairing input elements 302d may be the same as or different than the input elements 302a of the controller devices 302, respectively. In one embodiment, the controller devices 302, the operation-enacting devices 304, and the network coordinator device 306 are paired into the wireless network 308 without interaction with any input element. Instead, the controller devices 302, the operation-enacting devices 304, and the network coordinator device 306 are automatically paired into the wireless network 308.

When the pairing session ends, the network coordinator device 306 is configured to transmit, to the operation-enacting devices 304, the roster 310 identifying the controller devices 302 and the operation-enacting devices 304 paired to the wireless network 308. The operation-enacting devices 304 are configured to determine, based on the roster 310 received from the network coordinator device 306, how to enact operations in response to the signals 302b received from the controller devices 302.

The operation-enacting devices 304 are configured to process a default set of assignments 312 based on the roster 310 to determine how the operation-enacting devices 304 enact the operations responsive to the signals 302b. The default set of assignments 312 may be transmitted to each operation-enacting device 304 by the network coordinator device 306, and/or stored locally on each operation-enacting device 304.

For example, after a pairing session is completed, the roster 310 may include a right controller device with a right shift lever, a left controller device with a left shift lever, a front derailleur, and a rear derailleur. The default set of assignments 312 controlling the operation of the operation-enacting devices 304 is determined according to the particular set of devices in the roster 310. For example, the default set of assignments 312 may provide that with the example roster 310 above: (i) the rear derailleur shifts the chain to a sprocket inboard relative to the frame of the bicycle in response to a signal corresponding to a short duration button press from the right controller device (with no signals from the left controller device); (ii) the rear derailleur shifts the chain to a sprocket outboard relative to the frame of the bicycle in response to a signal corresponding to a long duration button press from the right controller device (with no signals from the left controller device); and (iii) the front derailleur shifts the chain to an alternate chainring in response to a signal from the left controller device. If the roster 310 includes a different set of devices, the default set of assignments 312 may be different. For example, if the roster 310 includes a height-adjustable seat post assembly and does not include a front derailleur, the seat post assembly may lower the seat in response to a signal from the left controller device. Other configurations may be provided.

Although the default set of assignments 312 may provide an effective approach for determining how the operation-enacting devices 304 should respond to the signals 302b from the controller devices 302, the user may prefer to use a modified set of assignments 312'. For example, the modified set of assignments 312' may provide that with the example roster 310 above: (i) the rear derailleur shifts the chain to an inboard sprocket relative to the frame of the bicycle in response to signals corresponding to a short button press from the right controller device (without signals from the left controller device); (ii) the front derailleur shifts the chain to an alternate chainring in response to signals corresponding to a long button press from the right controller device (without signals from the left controller device); and (iii) the rear derailleur shifts the chain to the chain to an outboard sprocket relative to the frame of the bicycle in response to signals from the left controller device.

As shown further in FIG. 3, the network coordinator device 306 may include the second wired and/or wireless communication interface 306b configured to receive the modified set of assignments 312', where the modified set of assignments 312' causes at least one operation enacted by an operation-enacting device 304 to occur in response to the signals 302b from a different controller device 302. The second communication interface 306b may employ a different protocol than the first communication interface 306a, particularly if the first communication interface 306a employs a proprietary protocol. The modified set of assignments 312' may be defined by the user within, for example, the mobile application, and transmitted to the operation-enacting devices 304 via the second wired and/or wireless communication interface 306b of the network coordinator device 306.

Each controller device of the plurality of controller devices 302 and each operation-enacting device of the plurality of operation-enacting devices 304 may include one or more additional components in addition to or instead of an input element (e.g., a pairing input element 302d, 304b, or 306c) for pairing into the wireless network 308. For example, each device 302, 304 may include one or more sensors (e.g., distance measurement sensors).

Figure 4:
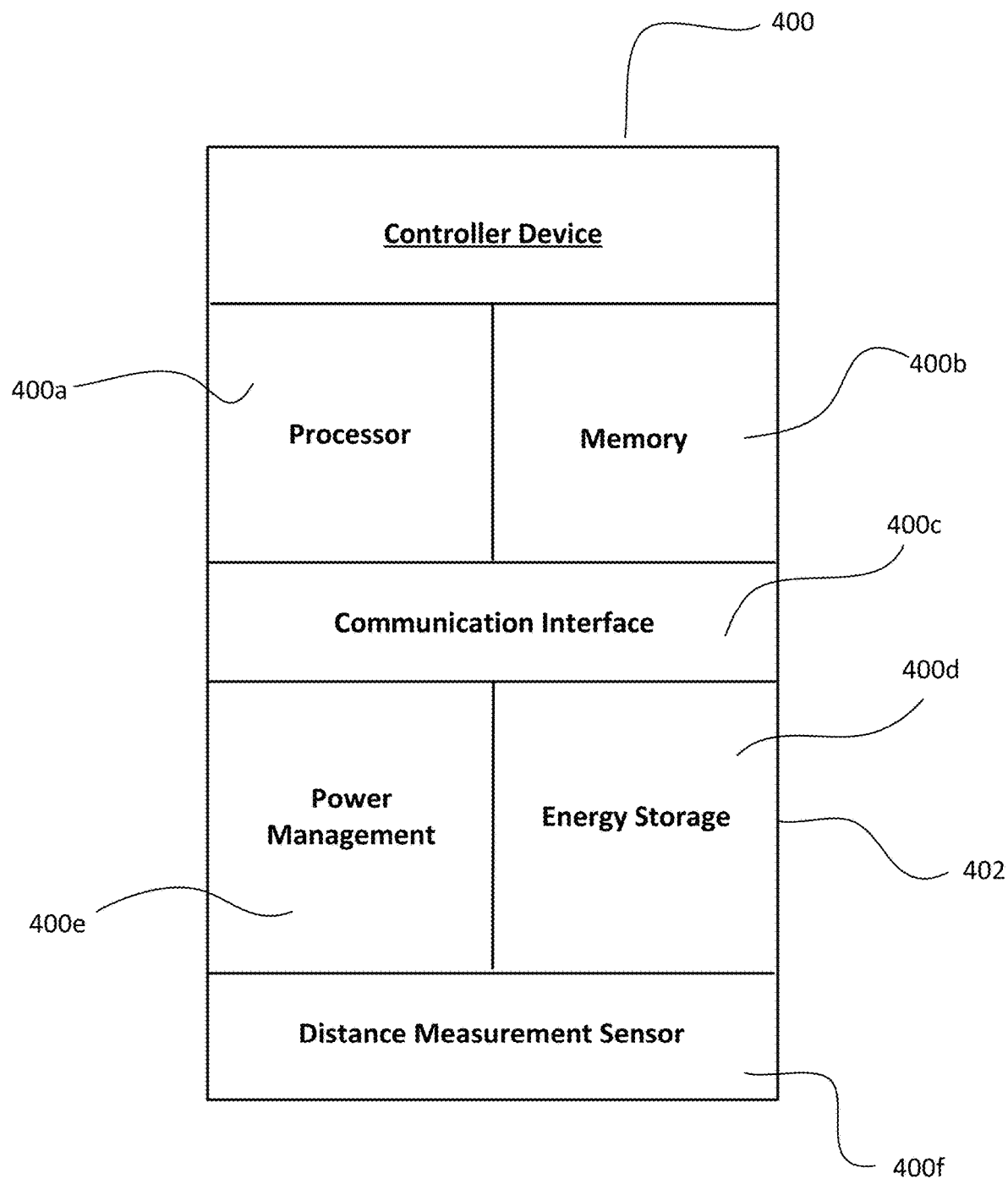
FIG. 4 illustrates an example controller device, according to aspects of the present disclosure.

FIG. 4 illustrates another embodiment of a controller device 400. The controller device 400 may be a controller device of the plurality of controller devices 302, an operation-enacting device of the plurality of operation-enacting devices 304, or the network coordinator device 306.

The controller device 400 includes, for example, a processor 400a, a memory 400b, and a communication interface 400c. The processor 400a, the memory 400b, and the communication interface 400c may be supported by and in communication with each other via, for example, a printed circuit board (PCB). The PCB may be supported by a housing 402.

The processor 400a may include a general processor, digital signal processor, an application specific integrated circuit (ASIC), field programmable gate array (FPGA), analog circuit, digital circuit, combinations thereof, or other now known or later developed processor. The processor 400a may be a single device or combinations of devices, such as through shared or parallel processing.

The memory 400b may be any number of different types of memory. For example, such memory may be a volatile memory or a non-volatile memory. The memory may include one or more of a read only memory (ROM), random access memory (RAM), a flash memory, an electronic erasable program read only memory (EEPROM), or other type of memory. The memory may be removable from the corresponding device, such as a secure digital (SD) memory card. Computer memory includes any one or more of a computer-readable medium and other equivalents and successor media, in which data or instructions may be stored. In general, a computer-readable medium includes any medium that is capable of storing, encoding or carrying a set of instructions for execution by a processor or that cause a computer system to perform any one or more of the methods or operations disclosed herein.

The communication interface 400c provides for wireless communications in any now known or later developed format. Although the present specification describes components and functions that may be implemented in particular embodiments with reference to particular standards and protocols, the invention is not limited to such standards and protocols. In one embodiment, the controller device 400 includes two or more communication interfaces 400c configured to communicate using different standards or protocols.

The controller device 400 may include one or more additional components supported by the housing 402 and in communication with the processor 400a, the memory 400b, and/or the communication interface 400c via the PCB. For example, the controller device 400 may also include an energy storage device 400d (e.g., power supply), power management electronics 400e, and/or one or more sensors 400f.

The energy storage device 400d may include one or more batteries or other power providing devices. Specially fitted or configured battery types, or standard battery types such as CR 2012, CR 2016, and/or CR 2032 may be used.

The power management electronics 400e may include any number of different electronic components (e.g., one or more capacitors and/or one or more diodes) and/or any number of electronic circuits supported by and/or electrically connected to the PCB or another PCB supported by the housing 402, for example. For example, the power management electronics 400e may include one or more rectifiers, converters, inverters, voltage regulators, other electronic components and/or electronic components, or any combination thereof.

The one or more sensors 400f may include any number of different types of sensors. For example, the one or more sensors 400f may include a distance sensor. In one embodiment, the distance sensor 400f is an ultra-wideband radio. Information may be transmitted across a wide bandwidth of frequencies using the ultra-wideband radio. The ultra-wideband radio is low power and allows for short-range, high-bandwidth communications. The ultra-wideband radio may generate radio waves with short pulses (e.g., nanosecond), which allows a time period between transmission of a radio wave by the ultra-wideband radio 400f of the controller device 400, for example, and receipt of the radio wave by another ultra-wideband radio of another controller device to be determined accurately. A distance between the ultra-wideband radio 400f of the controller device 400 and the other ultra-wideband radio of the other controller device may also be determined accurately based on the determined time period. The wide bandwidth of frequencies (e.g., a pattern of frequencies) of the radio waves transmitted by the ultra-wideband radio 400f and received by the other ultra-wideband radio may be analyzed (e.g., by a processor of the other controller device) to determine a direction from which the radio waves are transmitted.

In one embodiment, the ultra-wideband radio 400f is an ultra-wideband radio module with a general-purpose multi-protocol system-on-a-chip (SOC) such as, for example, an nRF52832. For example, the ultra-wideband radio 400f is the DWM1001C module manufactured by Qorvo™ of Greensboro, North Carolina. Such an ultra-wideband radio 400f may be attached to an outer surface of the housing 402. Ultra-wideband drivers and libraries already exist for the nRF52 platform. In another embodiment, the ultra-wideband radio 400f is, for example, the DWM3000 module manufactured by Qorvo™. Such an ultra-wideband radio 400f may be integrated onto a printed circuit board assembly (PCBA) of the controller device 400 and communicate with an nRF52840 via the PCBA. Additional and/or different ultra-wideband radios 400f may be provided.

Figure 5:
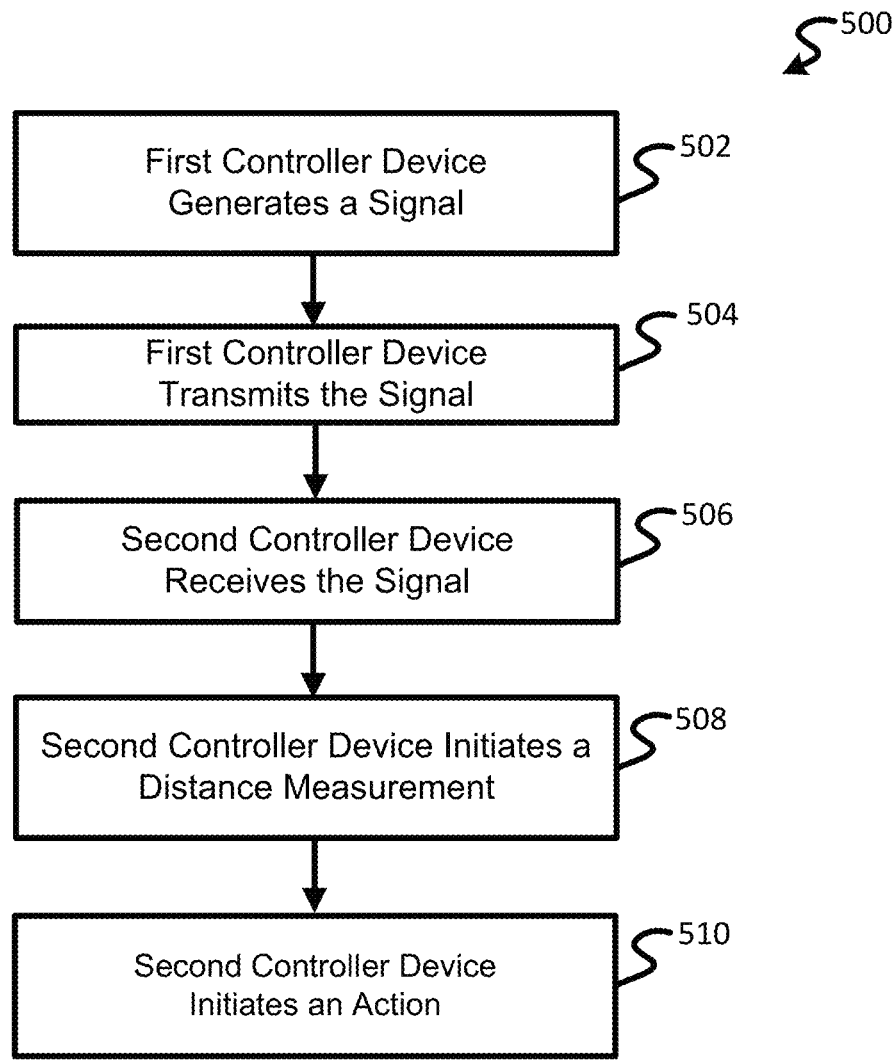
FIG. 5 is a flow chart of an embodiment of a method for pairing electronic bicycle components.

FIG. 5 illustrates a method 500 for paring one or more electronic components (e.g., the controller devices 400) into a network of a bicycle. For example, the method 500 may be executed to pair a first electronic bicycle component and a second electronic bicycle component into a network of the bicycle. The acts of the method 500 presented below are intended to be illustrative. In some embodiments, the method 500 may be accomplished with one or more additional acts not described, and/or without one or more of the acts discussed. Additionally, the order in which the acts of the method 500 are illustrated in FIG. 5 and described below is not intended to be limiting.

In some embodiments, the method 500 may be implemented in one or more processing devices (e.g., digital processor, an analog processor, a digital circuit designed to process information, an analog-circuit designed to process information, a state machine, and/or other mechanisms for electronically processing information). The one or more processing devices include one or more devices executing some or all the acts of the method 500 in response to instructions stored electronically on an electronic storage medium. The one or more processing devices are configured through hardware, firmware, and/or software to be specifically designed for execution of one or more of the acts of the method 500. As presented in the following, acts may be performed using any combination of the components indicated in FIGS. 1A-1E, 2A-2C, 3, 4, and/or other components.

In act 502, a first controller device generates a signal. The first controller device includes a first communication interface, a first sensor, and a first processor in communication with the first sensor and the first communication interface. The first sensor includes a first ultra-wideband radio. The first controller device may generate the signal in response to be woken up.

The first controller device is in an unpaired state. When in the unpaired state, the processor of the first controller device may generate the signal periodically (e.g., once every 0.1 s, 0.01 s, or 0.001 s). The signal may, for example, identify the first controller and/or the unpaired state of the first controller. The signal may include additional, less, and/or different information.

The first controller device may be any number of electronic devices of the bicycle. For example, the first controller device is a shifter device, a rear derailleur, a seatpost assembly, or another electronic component of the bicycle. In one embodiment, the first controller device is an electronic device of another bicycle.

In act 504, the first controller device transmits the signal generated in act 502. The first controller device may transmit the signal generated in act 502 via, for example, the first communication interface of the first controller device. The first controller device may not transmit the signal generated in act 502 to a particular destination.

In act 506, a second controller device receives the signal transmitted by the first controller device in act 504. The second controller device includes a second communication interface, a second sensor, and a second processor in communication with the second sensor and the second communication interface. In one embodiment, the second processor of the second controller device receives the signal transmitted by the first controller device in act 504 via the second communication interface of the second controller device.

The second controller device is in an unpaired state. When in the unpaired state, the second controller device may listen for signals and/or messages from other electronic devices of the bicycle (e.g., the first controller device) and/or off the bicycle. For example, the second processor of the second controller device may listen for and receive, via the second communication interface, the signal transmitted by the first controller device in act 504. The second controller device may begin listening for the signals and/or the messages in response to be woken up.

The second controller device may be any number of electronic devices of the bicycle. For example, the second controller device is a rear derailleur, a seatpost assembly, or a shifter of the bicycle. The second controller device may be, for example, a primary controller device that initiates and/or controls pairing of electronic components of the bicycle.

The first controller device and the second controller device, for example, may wake up when, for example, the first controller device (e.g., a handlebar-mounted controller device such as a shifter device) moves relative to the second controller device (e.g., the rear derailleur, including at least a portion that is positionally fixed relative to the frame of the bicycle). The movement may be determined based on a distance measurement using the first ultra-wideband radio and an ultra-wideband radio of the second controller device (e.g., a second ultra-wideband radio). In such an embodiment, the first controller device and the second controller device may not include accelerometers for identification of movement of the bicycle and/or for wake up of the first controller device and the second controller device. Use of the first ultra-wideband radio and the second ultra-wideband radio instead of accelerometers for wakeup may lead to fewer parts for the first controller device and the second controller device, respectively, and fewer unwanted wake-ups since handlebar movement requires more effort by the user than vibration.

In act 508, in response to the signal received in act 506, the second controller device initiates a distance measurement between the second controller device and the first controller device. The second sensor includes the second ultra-wideband radio. In one embodiment, the distance measurement between the second controller device and the first controller device initiated in act 508 uses the second ultra-wideband radio of the second controller device and the first ultra-wideband radio of the first controller device.

In one embodiment, the second processor of the second controller device initiates the distance measurement by initiating a time of flight (ToF) measurement. The second processor of the second controller device determines a time period between transmittal of a challenge message (e.g., a challenge packet) via, for example, the second ultra-wideband radio of the second controller device to, for example, the first ultra-wideband radio of first controller device, and receipt of a response message (e.g., a response packet) from the first controller device. The second processor may then determine the ToF based on the determined time period. For example, the second processor may subtract a time to respond (e.g., a time period between the receipt of the challenge packet by the first controller device and transmission of the response packet by the first controller device) from the determined time period and divide by two to determine the ToF.

The second processor may then determine the distance between the second controller device and the first controller device based on the determined ToF. For example, the second processor may determine the distance between the second controller device and the first controller device by multiplying the determined ToF by a wave speed of the particular radio wave pulse generated by, for example, the second ultra-wideband radio for the distance measurement.

In one embodiment, the first processor of the first controller device, instead of the second processor of the second controller device, determines the distance between the second controller device and the first controller device. For example, with the initiation of the distance measurement, the second processor of the second control device instructs the first processor to determine and report the distance between the second controller device and the first controller device.

In act 510, the second controller device initiates an action of the second controller device, the first controller device, or an electronic device in communication with the second controller device based on the distance measured in act 508. For example, the second processor of the second controller device compares the distance measured in act 508 to a predetermined threshold distance. The second controller device may initiate the action when, for example, based on the comparison, the distance measured in act 508 is less than the predetermined threshold distance. In one embodiment, the predetermined threshold distance may represent a maximum distance from the second controller device another component on the bicycle may be located.

The second controller device, the first controller device, and/or the electronic device in communication with the second controller device includes a memory. For example, a memory of the second controller device stores the predetermined threshold distance, and the second processor identifies the stored predetermined threshold distance for the comparison.

In one embodiment, the action initiated by the second controller device in act 510 is the pairing of the first controller device with the second controller device. For example, the first controller device may be paired into a wireless network that includes the second controller device when, based on the comparison, the distance measured in act 508 is less than the predetermined threshold distance. The first controller device may be paired with the second controller device without user interaction (e.g., automatically).

Alternatively or additionally, the action initiated in act 510 may be the generation of data identifying the first controller device as available and within range for pairing, the transmission of the generated data to, for example, a mobile computing device (e.g., a mobile phone), and/or the display of a representation of the generated data in an application running on the mobile computing device (e.g., within a list of discovered unpaired devices). A user of the computing device (e.g., a rider of the bicycle) may then interact with the representation in the application to select the first controller device for pairing with the second controller device. The second processor of the second controller device may initiate the pairing of the first controller device with the second controller device in response to the user selection within, for example, the application running on the mobile computing device.

In one embodiment, when, for example, the second processor of the second controller device determines, based on the comparison of the distance measured in act 508 to the predetermined threshold distance, that the measured distance is greater than the predetermined threshold distance, the second controller does not initiate the action. In other words, the second controller device may ignore the signal received in act 506 as coming from a controller device or an electronic bicycle off the bicycle (e.g., located on another bicycle).

Acts 502-510 may be repeated for, for example, other unpaired controller devices generating (act 502) and transmitting (act 504) identifying signals ultimately received by the second controller device (act 506). For example, the method 500 described above may be repeated each time the second controller device is in a listening mode and receives an identifying signal generated and transmitted by a different electronic device (e.g., unpaired controller device). When the method 500 is repeated for a third controller device (e.g., another shifter device), the signal and the measured distance discussed above are a first signal and a first measured distance, respectively.

The method 500 may be repeated any number of times for any number of controller devices and/or other electronic components. For example, as part of the repeated method 500, the second controller device receives a second signal from the third controller device (repeated act 506). In response to the received second signal, the second controller device initiates a distance measurement (e.g., repeated act 508) and determines a distance between the second controller device and the third controller device (e.g., a second distance). The third controller device includes a third ultra-wideband radio, and the distance between the second controller device and the third controller device is measured using the second ultra-wideband radio and the third ultra-wideband radio. The second controller device may compare the determined second distance to the predetermined threshold distance (repeated act 510); when, based on the comparison of the determined second distance to the predetermined threshold distance, the determined second distance is less than the predetermined threshold distance, the second controller device may pair the third controller device with the second controller device (e.g., into the network).

To summarize, assuming that at least two controller devices are physically connected to a bicycle and are in unpaired states, respectively, then a primary controller device such as, for example, an electronic rear derailleur or an electronic seatpost may periodically listen for wireless messages from other unpaired electronic devices. When the primary controller device receives a message from one or more unpaired devices, then the primary controller device initiates a distance measurement to determine a distance between the primary controller device and the one or more unpaired devices (e.g., within range of an ultra-wideband radio). If the one or more unpaired devices are within a predetermined distance from the primary controller device, then the primary controller device may either initiate pairing between all controller devices within the predetermined distance or may provide information to the user via, for example, a smartphone application. If information is sent to the smartphone application, then the user may select one or more devices from a list of unpaired devices for pairing.

Once controller devices (e.g., including the primary controller device) on the bicycle are paired, distance determinations using the respective ultra-wideband radios of the controller devices, for example, may be used to detect lost equipment. For example, when the determined distance between any two paired controller devices of the bicycle exceeds the predetermined threshold distance or another predetermined threshold distance, the second controller device, for example, may identify that one of the two paired controller devices has been lost (e.g., has fallen off the bicycle during a ride). The identification of the lost controller device may be reported to the user via, for example, the mobile computing device (e.g., the application running on the mobile computing device).

In other embodiments, the action initiated by the second controller device in act 510 may not be related to pairing. The action may instead be related to the reporting of the distance between the second controller device and, for example, the first controller device measured in act 508. The first controller device may be off the bicycle. For example, the first controller device may be installed on another bicycle.

The user (e.g., a first rider) may, for example, want to track a particular bicycle (e.g., the other bicycle) and/or rider (e.g., a second rider) during a ride or race. The first rider may enter identifying information for the other bicycle (e.g., identification data for a controller device or another electronic component of the other bicycle) into, for example, the application of the mobile computing device or another interface at the bicycle, and the memory may store the identifying information for the other bicycle. The second controller device may identify the other bicycle as a bicycle to be tracked based on a comparison of the signal received in act 506 and the stored identifying information.

Individual acts of the method 500 may be repeated any number of times. For example, the initiation of a distance measurement between the second controller device and the first controller device of act 508 may be repeated any number of times at a predetermined interval until a predetermined condition is satisfied. In one embodiment, when, based on the comparison in act 510, the second controller device determines the measured distance between, for example, the second controller device and the first controller device is greater than the predetermined threshold distance, instead of otherwise ignoring the signal received in act 506, the second controller device may initiate the display (e.g., in the application of the mobile computing device) of a representation (e.g., text) of the first controller device and the measured distance. The representation may be based on information included within the signal received in act 506 and/or additional data received from the first controller device via, for example, the second communication interface of the second controller device. In such an embodiment, the predetermined threshold distance may represent a distance the first rider wants to stay within relative to the second rider, for example. For example, the second rider may set a particular pace, and the first rider wants to match the particular pace.

Other notifications related to the distance between the bicycle (e.g., the second controller device) and the other bicycle (e.g., the first controller device) may be provided. For example, based on the comparison in act 510, the second processor of the second controller device, for example, may initiate a notification when the second rider (e.g., the first controller device), for example, is nearby, when the second rider is falling behind (e.g., relative to the first rider and the second controller device), when the second rider is catching up, and/or when the second controller device (e.g., the second ultra-wideband radio) loses contact with the second rider (e.g., the first ultra-wideband radio of the first controller device).

The determined distance may be communicated to the user in any number of ways. For example, the second controller device may initiate display of the determined distance at, for example, the mobile computing device (e.g., in the application). In one embodiment, the determined distance is displayed with identifying information for the first controller device and/or the other bicycle, on which, for example, the first controller device is installed. The identifying information may be received by the second controller device as part of the signal received in act 506 and/or other communications from the first controller device.

The determined distance may be communicated to the user in other ways. For example, the second controller device initiates communication of the determined distance via a sound generator (e.g., a speaker) of, for example, the mobile device or another electronic component of the bicycle. In one embodiment, the determined distance is provided to a third party ride tracking software for further review and analysis by the user after a ride.

Communication of the determined distance may provide a number of benefits to the user. For example, if the user is a lead rider, the communicated distance may identify when the user needs to slow down or speed up for riding partners. If, for example, a following rider falls behind due to, for example, speed or a crash, the user as the lead rider, for example, would know to turn around and check on the following rider. Knowing a rate of catch up from a following rider may push the user as the lead rider, for example, to work harder during training.

The second processor of the second controller device may further process distances between the second controller device and the first controller device repeatedly measured in act 508 at a plurality of different time points. For example, the second processor of the second controller device may calculate and track a relative speed of the first controller device (e.g., the other bicycle) compared to the second controller device (e.g., the bicycle) based on the distances measured in act 508 at the plurality of different time points.

In act 510, the second controller device may initiate display, for example, of the relative speed at, for example, the mobile computing device.

In one embodiment, the second controller device may initiate communication of the determined distance to the user (e.g., via the application on the mobile computing device) without any comparison of the distance determined in act 508 to the predetermined threshold distance. In other words, the second controller device may determine (e.g., track) the distance between the second controller device (e.g., the bicycle) and the first controller device (e.g., the other bicycle) and report the determined distance to the user without any comparison to a threshold distance.

In one embodiment, the first controller device may be a fixed location controller device. For example, bicycle race operators or mountain bike trail builders may install fixed location controller devices, and once in range, the second controller device of the bicycle may initiate distance and direction measurements to the fixed location controller devices. The distance and direction measurements to fixed location controller devices in range may be displayed to the rider at, for example, the mobile computing device. The distance measurements may provide course information and guidance to the rider. Further, the fixed location controller device may determine and store speed and position of the bicycle by tracking a rate at which the distance between the fixed location controller device and the second controller device of the bicycle, for example, changes.

In another embodiment, as a part of act 508, each controller device on the bicycle (e.g., the first controller device, the second controller device, and the third controller device) may measure the distance and direction (e.g., angle) to every other controller device on the bicycle. As an example, the second controller device may measure the distance and direction to the first controller device using the second ultra-wideband radio and the first ultra-wideband radio, the second controller device may measure the distance and direction to the third controller device using the second ultra-wideband radio and the third ultra-wideband radio, respectively, and the first controller device may measure the distance and direction to the third controller device using the first ultra-wideband radio and the third ultra-wideband radio, respectively.

In one embodiment, when the bicycle includes a plurality of controller devices (e.g., the first controller device and the second controller device) including a plurality of ultra-wideband radios, respectively, and the other bicycle includes at least one controller device including an ultra-wideband radio (e.g., the third controller device), a controller device of the plurality (e.g., the second controller device) may triangulate a relative distance and angle of the other bicycle based on the distance and direction determinations.

The second processor of the second controller device, for example, may further process (e.g., as part of act 510) the distance and angle measurements, such that bicycle dynamics may be measured. For example, the second processor may further process the distance and angle measurements from the second controller device (e.g., a fixed controller device relative to a frame of the bicycle) to the first controller device (e.g., a left shifter device) and the third controller device (e.g., a right shifter device), respectively, to determine, for example, a steering angle of a front wheel of the bicycle.

Figure 6:
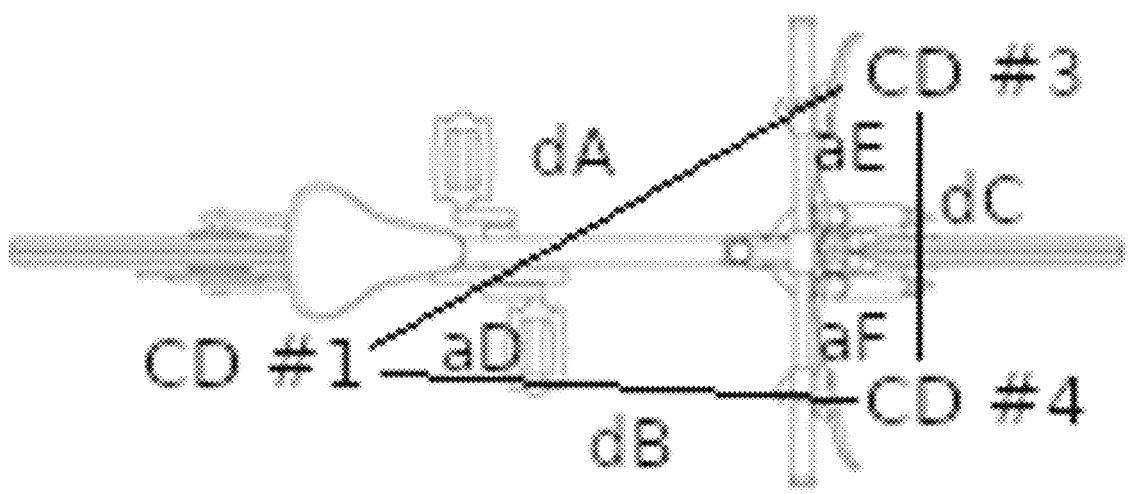
FIG. 6 illustrates an example of bicycle dynamics calculation using distance and direction measurements according to aspects of the present disclosure.

Referring to FIG. 6, given that a distance dC (e.g., the measured distance between the first controller device, the left shifter device, and the third controller device, the right shifter device) is fixed, it may be assumed that when a distance dA (e.g., a distance between the second controller device, the rear derailleur, and the first controller device) is equal to a distance dB (e.g., a distance between the second controller device and the third controller device), then the front wheel is straight. If the distance dA is less than the distance dB, then the front wheel is turned left. If the distance dA is greater than the distance dB, then the front wheel is turned right.

The second processor of the second controller device, for example, may perform a calibration when the handlebar of the bicycle is straight. The second processor of the second controller device, for example, may use the distances dA, dB, and dC to calculate a steering angle offset $aE_0$ using the equation:

$$aE = \cos^{-1}\left(\frac{dC^2 + dA^2 - dB^2}{2 * dC * dA}\right) \qquad (1)$$

The second controller device, for example, may store the steering angle offset $aE_0$ in a memory (e.g., the memory of the second controller device) as an angle offset for 0 degrees of steering angle. Any time the second processor determines the steering angle (e.g., a current steering angle) using Equation 1, the second processor subtracts the calculated steering angle offset $aE_0$ from a newly calculated steering angle aE. The calculated steering angle may be reported to the rider via, for example, the mobile computing device (e.g., the application running on the mobile computing device).

Steering angle measurements provide data points for tracking bicycle and rider stability. The steering angle measurements may be used by the user to optimize setup of the bicycle and/or wheel configuration. For example, if during a ride the second controller device, for example, identifies large amounts of steering instability and the user knows that the ride was on a windy day, the user may consider switching to a lower profile wheel based on the identified steering instability.

In one embodiment, a controller device may be located on each suspension component of the bicycle (e.g., the first controller device, the second controller device, and the third controller device). While the user is riding, suspension dynamics such as travel and rebound may be measured by determining the distance and direction from each fixed controller device (e.g., the second controller device) to each of the controller devices located on a suspension component. The second processor of the second controller device, for example, may use Equation 1 to measure suspension dynamics in the same way as steering angle, as described above.

In one embodiment, a controller device (e.g., the first controller device) including an ultra-wideband radio may be located on a tire pressure sensor. The second controller device (e.g., part of the rear derailleur), for example, may be fixed relative to a frame of the bicycle, and may determine a distance between the second controller device and the controller device on the tire pressure sensor (e.g., using the second ultra-wideband radio and the ultra-wideband radio on the tire pressure sensor) as a wheel to which the tire pressure sensor is attached rotates. The second controller device, for example, may measure when the tire pressure sensor is at a closest distance and when the tire pressure sensor is at a furthest distance, and determine a wheel speed based on a time between the two measurements. This may allow the wheel speed to be tracked and reported to the user via, for example, the mobile computing device (e.g., within the application running on the mobile computing device).

In one embodiment, a key component (e.g., a key) may be provided to the user when the user purchases the bicycle. A bike shop or dealer may require the key to be present when selling the bicycle or a bicycle component to prove ownership. The key may include an ultra-wideband radio (e.g., may be a controller device) and may communicate with, for example, the second ultra-wideband radio of the second controller device and/or other ultra-wideband radios of other controller devices of the bicycle. The second controller device, for example, may prevent actuation of any components on the bicycle unless the key is within the predetermined threshold distance or another predetermined threshold distance relative to the second controller device, as determined by the second ultra-wideband radio and the ultra-wideband radio of the key. The key may be any number of different devices including, for example, a purpose built device, such as a key fob, and/or a mobile computing device (e.g., a mobile phone or a head unit paired with a network of the bicycle). In one embodiment, at least some of the components of the bicycle (e.g., the first controller device) do not wake up unless the key is within, for example, the predetermined threshold distance relative to, for example, the second controller device. Theft of the bicycle would be more, as the bicycle could not be ridden without the key.

In one embodiment, if the bicycle is an e-bike, the second controller device, for example, may control (e.g., modulate) assist of the e-bike based on a determined distance to an adjacent bicycle (e.g., using the second ultra-wideband radio of the second controller device and the first ultra-wideband radio of the second controller device located at the adjacent bicycle). For example, if the second controller device, for example, determines the e-bike is traveling at a greater speed than the adjacent bicycle (e.g., the determined distance is increasing), the second controller device may limit the assist provided by the e-bike. As another example, if the second controller device, for example, determines the e-bike is traveling at a lesser speed than the adjacent bicycle (e.g., the determined distance is decreasing), the second controller device may increase the assist provided by the e-bike.

Figure 7:
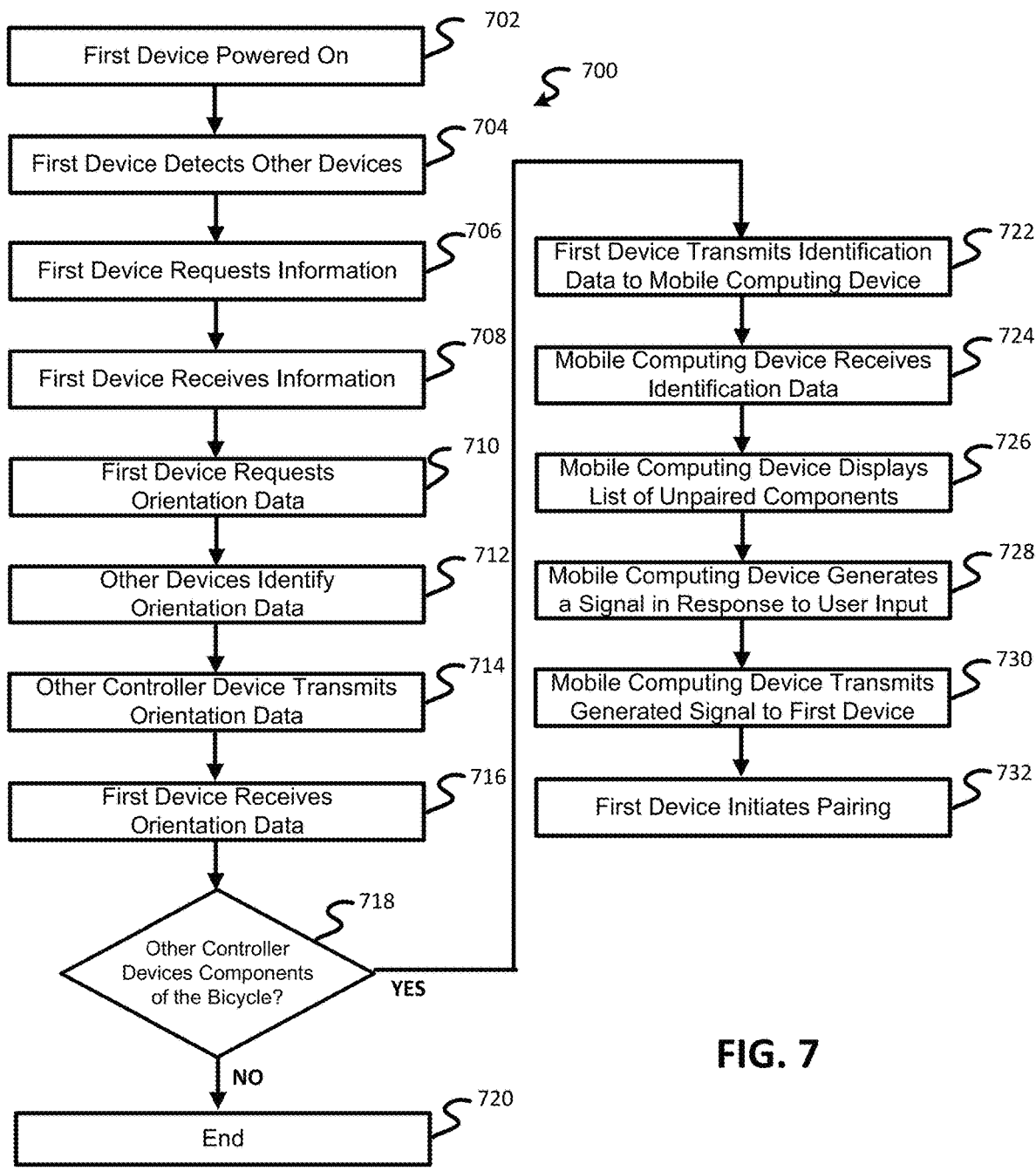
FIG. 7 is a flow chart of yet another embodiment of a method for pairing electronic bicycle components.

FIG. 7 illustrates another method 700 for paring one or more electronic components (e.g., the controller devices 400) into a network of a bicycle. For example, the method 700 may be executed to pair a first electronic bicycle component and a second electronic bicycle component into a network of the bicycle. The acts of the method 700 presented below are intended to be illustrative. In some embodiments, the method 700 may be accomplished with one or more additional acts not described, and/or without one or more of the acts discussed. Additionally, the order in which the acts of the method 700 are illustrated in FIG. 7 and described below is not intended to be limiting.

In some embodiments, the method 700 may be implemented in one or more processing device (e.g., digital processor, an analog processor, a digital circuit designed to process information, an analog-circuit designed to process information, a state machine, and/or other mechanisms for electronically processing information). The one or more processing devices include one or more devices executing some or all the acts of the method 700 in response to instructions stored electronically on an electronic storage medium. The one or more processing devices are configured through hardware, firmware, and/or software to be specifically designed for execution of one or more of the acts of the method 700. As presented in the following, acts may be performed using any combination of the components indicated in FIGS. 1A-1E, 2A-2C, 3, 4, and/or other components.

In act 702, a first controller device is powered on. The first controller device is powered on by a user via one or more user interfaces (e.g., buttons) of the first controller device. The first controller device is in an unpaired state.

The first controller device is a primary controller device. The first controller device may be any number of different types of controller devices including, for example, a rear derailleur, a shifter device, an e-bike controller, or another electronic component of the bicycle.

The first controller device includes a first processor, a first sensor, a first communication interface, and a second communication interface. The first processor, the first sensor, the first communication interface, and the second communication interface are in communication with each other. The first sensor includes, for example, a first ultra-wideband radio. The first controller device may include more, fewer, and/or different components. For example, the first controller device may include a memory.

In act 704, the first controller device detects other controller devices (e.g., a second controller device and a third controller device) within a predetermined distance (e.g., two meters). The first controller device may detect the other controller devices via, for example, messages generated and transmitted by the other controller devices, respectively, and received by the first controller device via the first communication interface. The first communication interface may use the first ultra-wideband radio to transmit and receive messages. The second controller device and the third controller device, for example, may include a second ultra-wideband radio and a third ultra-wideband radio, respectively, and the messages received by the first controller device may include messages generated and transmitted by the second ultra-wideband radio and the third ultra-wideband radio, respectively. The predetermined distance may be set by a range of communication via the first communication interface.

In act 706, the first controller device requests information from the other controller devices (e.g., the second controller device and the third controller device) detected in act 704 via the second communication interface. The second communication interface is different than the first communication interface. For example, the second communication interface uses a different type of transmitter/receiver than the first communication interface and/or wirelessly communicates using a different technique, protocol, or standard compared to the first communication interface. The requested information may include any number of different types of information. For example, the requested information may include a pairing status for each of the other controller devices.

In act 708, the first controller device receives the requested information from the other controller devices (e.g., the second controller device and the third controller device). For example, the first controller device receives the requested information from the other controller devices via the second communication interface. In one embodiment, the information received in act 708 is, for example, the pairing statuses for the other controller devices, respectively.

In act 710, the first controller device requests orientation data (e.g., distance and direction) from the other controller devices. The first controller device requests the orientation data from the other controller devices via, for example, the second communication interface. The orientation data may be, for example, orientation data between respective pairs of controller devices of the other controller devices.

For example, when the other controller devices include the second controller device and the third controller device, in act 710, the first controller device may request orientation data for the third controller device relative to the second controller device and/or the second controller device relative to the third controller device. The first controller device may request other orientation data. For example, the first controller device may request orientation data for the first controller device relative to the second controller device and/or the first controller device relative to the third controller device.

In other words, in act 710, the first controller device may request a distance and an angle between the other controller devices that are within the predetermined distance relative to the first controller device (e.g., a distance and an angle between the second controller device and the third controller device). In one embodiment, the second controller device is a left shifter device, and the third controller device is a right shifter. In such an embodiment, in act 710, the first controller device (e.g., the rear derailleur) requests the orientation data from the left shifter and/or the right shifter.

In other embodiments, the other controller devices include more or fewer controller devices. For example, the other controller devices may also include a fourth controller device (e.g., an electronic seatpost), and the requested orientation data includes orientation data for the fourth controller device relative to the second controller device, the fourth controller device relative to the third controller device, the second controller device relative to the fourth controller device, and/or the third controller device relative to the fourth controller device.

In act 712, the other controller devices may identify the orientation data requested in act 710. For example, the other controller devices may determine the orientation data using the first communication interfaces of the other controller devices, respectively. In the embodiment in which the other controller devices include the second controller device and/or the third controller, the orientation data (e.g., the orientation data for the second controller device relative to the third controller device and/or the third controller device relative to the second controller device) may be determined using the second ultra-wideband radio and the third ultra-wideband radio, for example. For example, the second controller device and/or the third controller device may determine the orientation data based on a time-of-flight measurement between the second controller device and the third controller device using the second ultra-wideband radio and the third ultra-wideband radio. The other controller devices may identify the information requested in act 710 in other ways. For example, the orientation data may be stored in one or more of the other controller devices (e.g., a memory of the second controller device), and one of the other controller devices (e.g., the second controller device) may identify the requested information from, for example, the stored orientation data.

In act 714, at least one of the other controller devices (e.g., the second controller device) may transmit the identified orientation data to the first controller device. For example, the second controller device may transmit the orientation data via the second communication interface of the second controller device and the second communication interface of the second controller. In one embodiment, the identified orientation data is determined by or stored at two or more of the other controller devices, and the two or more other controller devices (e.g., the second controller device and the third controller device) transmit the identified orientation data to the first controller device.

In act 716, the first controller device receives the orientation data identified in act 712. For example, the first controller device receives the orientation data identified in act 712 via the second communication interface of the first controller device.

In act 718, the first controller device determines whether the other controller devices are components of the bicycle based on the orientation data identified in act 712. For example, the first processor of the first controller device compares the orientation data to predetermined orientation data to determine whether the other controller devices are components of the bicycle.

In one embodiment, the memory of the first controller device, for example, stores the predetermined orientation data as distance ranges, maximum distances, relative angle ranges, and/or maximum relative angles between different combinations of bicycle components. The predetermined orientation data may be stored in one or more tables in the memory. The predetermined orientation data may be generated and stored in the memory of the first controller device when or after the first controller device, for example, is manufactured. The predetermined orientation data may be generated based on previous bicycle configurations and/or maximum possible bicycle configurations (e.g., widest separation of the left shifter device and the right shifter device possible based on a widest handlebar sold).

In act 718, to determine whether the other controller devices are components of the bicycle, the first processor of the first controller device, for example, may compare subsets of the orientation data (e.g., orientation data between the second controller device and the third controller device) to the predetermined orientation data. For example, the first processor of the first controller device may identify the second controller device and the third controller device as shifter devices (e.g., a left shifter device and a right shifter device) based on identification information (e.g., a device type) included with the orientation data received in act 716, the information received in act 708, the messages received in act 704, and/or other received data from the second controller device and the third controller device, respectively. The first processor of the first controller device may compare the orientation data received in act 716 (e.g., for the second controller device relative to the third controller device, the third controller device relative to the second controller device, the second controller device relative to the first controller device, and/or the third controller device relative to the first controller device) to subsets of the predetermined orientation data (e.g., stored in the table) corresponding to shifter devices, for example.

For example, the memory of the first controller device may store, as the predetermined orientation data for shifter devices (e.g., in the table), a maximum distance between shifter devices (e.g., to be compared to the orientation data for the second controller device relative to the third controller device), a maximum distance, a maximum angle, and/or a range of allowable angles between a shifter device and a rear derailleur (e.g., to be compared to the orientation data for the second controller device and/or the third controller device relative to the first controller device), and/or other orientation data.

The first processor of the first controller device, for example, may determine whether the determined distance between the second controller device and the third controller device received in act 716, for example, is less than the maximum distance between shifter devices stored in the table. Alternatively or additionally, the first processor of the first controller device may determine whether the determined distance between the second controller device and the first controller device received in act 716, for example, is less than the maximum distance between the shifter device and the rear derailleur stored in the table and/or whether the determined distance between the third controller device and the first controller device received in act 716, for example, is less than the maximum distance between the shifter device and the rear derailleur stored in the table. Other comparisons may be provided.

If a result of any of the comparisons is negative (e.g., the determined distance between the second controller device and the first controller device is greater than the maximum distance between the shifter device and the rear derailleur stored in the table), the first processor of the first controller device may determine one or more of the other controller devices are not components of the bicycle. If the first processor of the first controller device determines, in act 718, none of the other controller devices are components of the bicycle, the method 700 moves to act 720 and ends. In other words, other than the actions in acts 706-718, the first controller device ignores the messages received by the first controller device.

If the first processor of the first controller device determines, in act 718, that at least one of the other controller devices is a component of the bicycle, the method 700 moves to act 722. In act 722, the first processor of the first controller device generates and transmits identification data to, for example, a mobile computing device (e.g., a mobile phone) in communication with the first controller device. The identification data may identify the at least one other controller device determined to be a component of the bicycle in act 718, for example. The first controller device may include a third communication interface and transmit the identification data to the mobile computing device via, for example, the third communication interface. The third communication interface may use a different type of transmitter/receiver than the first communication interface and/or the second communication interface. Further, the third communication interface may wirelessly communicate with the mobile computing device, for example, using a different technique, protocol, or standard compared to the first communication interface and/or the second communication interface.

In act 724, the mobile computing device receives the identification data transmitted by the first processor of the first controller via the third communication interface in act 722. In act 726, the mobile computing device generates and displays (e.g., within an application running on the mobile computing device) a list of component(s) on the bicycle that are unpaired based on the identification data received by the mobile computing device in act 724. The application running on the mobile computing device, for example, may generate and display text and/or icon(s) within the list corresponding to the component(s) on the bicycle that are unpaired. The displayed text and/or icon(s) may be selectable by a user via user input. For example, the mobile computing device may include a touchscreen, and the text and/or icon(s) may be displayed and selected by the user at the touchscreen.

In act 728, the mobile computing device generates a signal in response to user input at the mobile computing device. The signal may identify which text and/or icon(s) of the list (e.g., corresponding to one or more components on the bicycle that are unpaired) the user selected via the user input (e.g., at the touchscreen). In act 730, the mobile computing device transmits the generated signal to the first controller device. The mobile computing device transmits the generated signal to the first controller via, for example, the third communication interface of the first controller device.

In act 732, the first controller device receives the signal generated by the mobile computing device in act 728 and initiates pairing with one or more of the other controller devices based on the received signal. In other words, the first controller device initiates pairing with one or more unpaired components on the bicycle based on selection, by the user, of displayed text and/or icon(s) within the list displayed at the mobile computing device.

In accordance with various embodiments of the present disclosure, the methods described herein may be implemented with software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The methods and techniques described herein may be implemented using hardware configurations described herein and one or more computer programs providing instructions for the hardware. A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows may also be performed by, and the apparatus may also be implemented as, special purpose logic circuitry (e.g., a field programmable gate array (FPGA) or an application specific integrated circuit (ASIC)).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile computing device or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or is operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant ("PDA"), a mobile audio player, a Global Positioning System ("GPS") receiver, or a system control device to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a system control device is integrated with a mobile telephone, PDA, a mobile audio player, a GPS receiver, and communicates wirelessly with bicycle components to provide automatic mode control.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A controller device for a bicycle, the controller device comprising:
   a communication interface configured to receive a signal from another controller device;
   a sensor including an ultra-wideband radio, wherein in response to the received signal, the sensor is configured to determine a distance between the controller device and the other controller device using the ultra-wideband radio; and
   a processor in communication with the sensor, the processor being configured to initiate an action of the controller device or an electronic device in communication with the controller device based on the determined distance, wherein the ultra-wideband radio is a first ultra-wideband radio, the controller device is a first controller device of the bicycle, and the other controller device is a second controller device of the bicycle, and wherein the sensor is configured to determine a distance between the first ultra-wideband radio of the controller and a second ultra-wideband radio, the second ultra-wideband radio being an ultra-wideband radio of the second controller.

2. The controller device of claim 1, wherein the controller device is an electronic rear derailleur or an electronic seatpost.

3. The controller device of claim 1, wherein the processor is further configured to compare the determined distance to a predetermined threshold distance, and wherein the processor being configured to initiate the action of the controller device or the electronic device based on the determined distance comprises the processor being configured to initiate the action of the controller device or the electronic device when, based on the comparison, the determined distance is less than the predetermined threshold distance.

4. The controller device of claim 3, wherein the processor being configured to initiate the action of the controller device or the electronic device based on the determined distance further comprises the processor being configured to initiate pairing of the second controller device to the first controller device when, based on the comparison, the determined distance is less than the predetermined threshold distance.

5. The controller device of claim 4, wherein the signal is a first signal, and the distance is a first distance, wherein the communication interface is further configured to receive a second signal from a third controller device of the bicycle, wherein in response to the received second signal, the sensor is further configured to determine a second distance using the first ultra-wideband radio, the second distance being between the first controller device and a third controller device of the bicycle, and wherein the processor is further configured to:
compare the determined second distance to the predetermined threshold distance; and
initiate pairing of the third controller device to the first controller device when, based on the comparison of the determined second distance to the predetermined threshold distance, the determined second distance is less than the predetermined threshold distance.

6. The controller device of claim 5, wherein the processor is further configured to ignore the received second signal when, based on the comparison of the determined second distance to the predetermined threshold distance, the determined second distance is greater than the predetermined threshold distance.

7. The controller device of claim 1, wherein the other controller device is positionally fixed relative to a surface on which the bicycle is movable, wherein the processor being configured to initiate the action of the electronic device based on the determined distance comprises the processor being configured to communicate a representation of the determined distance using the electronic device.

8. The controller device of claim 1, wherein the controller device is a first controller device of the bicycle, and the other controller device is a second controller device of the bicycle, the second controller device of the bicycle being supported by a handlebar of the bicycle, and wherein the processor is further configured to determine a steering angle based on the determined distance, and wherein the processor being configured to initiate the action of the electronic device based on the determined distance comprises the processor being configured to initiate the action of the electronic device based on the determined steering angle.

9. The controller device of claim 1, wherein the controller device is a first controller device of the bicycle, and the other controller device is a second controller device of the bicycle, the second controller device of the bicycle being supported by a suspension component of the bicycle, wherein the processor is further configured to determine suspension dynamics based on the determined distance, and wherein the processor being configured to initiate the action of the electronic device based on the determined distance comprises the processor being configured to initiate the action of the electronic device based on the determined suspension dynamics.

10. The controller device of claim 1, wherein the suspension dynamics include travel and rebound of the suspension component.

11. A controller device for a bicycle, the controller device comprising:
a communication interface configured to receive a signal from another controller device;
a sensor including an ultra-wideband radio, wherein in response to the received signal, the sensor is configured to determine a distance between the controller device and the other controller device using the ultra-wideband radio; and
a processor in communication with the sensor, the processor being configured to initiate an action of the controller device or an electronic device in communication with the controller device based on the determined distance,
wherein the action of the electronic device comprises communication of a representation of the determined distance,
wherein the processor being configured to communicate the representation of the determined distance using the electronic device comprises the processor being configured to:
compare the determined distance to a predetermined threshold distance; and
notify a user of the controller device using the electronic device when, based on the comparison, the determined distance is less than the predetermined threshold distance or the determined distance is greater than the predetermined threshold distance.

12. The controller device of claim 11, wherein the electronic device includes a display, a sound generator, or the display and the sound generator, and wherein the processor is configured to notify the user of the controller device using the display, the sound generator, or the display and the sound generator when, based on the comparison, the determined distance is less than the predetermined threshold distance or the determined distance is greater than the predetermined threshold distance.

13. A system for a bicycle, the system comprising:
a first controller device comprising:
a first communication interface;
a first sensor including a first ultra-wideband radio; and a first processor in communication with the first sensor and the first communication interface, the first processor being configured to:
  generate a signal; and
  transmit, via the first communication interface, the signal; and
a second controller device comprising:
  a second communication interface;
  a second sensor including a second ultra-wideband radio; and
  a second processor in communication with the second sensor and the second communication interface, the second processor configured to:
    receive, via the second communication interface, the signal;
    in response to the received signal, initiate a distance measurement between the second controller device and the first controller device using the second ultra-wideband radio and the first ultra-wideband radio; and
    initiate an action of the second controller device, the first controller device, or an electronic device in communication with the second controller device based on the measured distance.

14. The system of claim 13, wherein the second controller device is an electronic derailleur or an electronic seatpost, and the first controller device is a shifter device.

15. The system of claim 14, wherein the second processor is further configured to compare the measured distance to a predetermined threshold distance, and
  wherein the second processor being configured to initiate the action based on the measured distance comprises the second processor being configured to initiate the action of the second controller device, the first controller device, or the electronic device when, based on the comparison, the measured distance is less than the predetermined threshold distance.

16. The system of claim 15, wherein the processor being configured to initiate the action of the second controller device, the first controller device, or the electronic device based on the measured distance further comprises the processor being configured to initiate pairing of the first controller device to the second controller device when, based on the comparison, the measured distance is less than the predetermined threshold distance.

17. The system of claim 14, wherein the second processor is further configured to determine a steering angle based on the measured distance, and
  wherein the processor being configured to initiate the action of the second controller device, the first controller device, or the electronic device based on the measured distance comprises the processor being configured to initiate display of a representation of the determined steering angle at the electronic device.

18. A controller device for a bicycle, the controller device comprising:
  a communication interface configured to receive a first signal from a first electronic device and a second signal from a second electronic device;
  a sensor including an ultra-wideband radio, wherein in response to the received first signal, the sensor is configured to determine a first distance using the ultra-wideband radio, the first distance being between the controller device and the first electronic device, and wherein in response to the received second signal, the sensor is configured to determine a second distance using the ultra-wideband radio, the second distance being between the controller device and the second electronic device; and
  a processor in communication with the sensor, the processor being configured to:
    compare the determined first distance to a predetermined threshold distance;
    compare the determined second distance to the predetermined threshold distance;
    initiate pairing of the first electronic device to the controller device when, based on the comparison of the determined first distance to the predetermined threshold distance, the determined first distance is less than the predetermined threshold distance; and
    initiate pairing of the second electronic device to the controller device when, based on the comparison of the determined second distance to the predetermined threshold distance, the determined second distance is less than the predetermined threshold distance.

* * * * *